United States Patent
Walker et al.

(10) Patent No.: US 9,037,972 B2
(45) Date of Patent: May 19, 2015

(54) APPARATUS AND METHOD FOR GRID NAVIGATION

(75) Inventors: Mark Leroy Walker, Los Angeles, CA (US); David Pettigrew, Marin, CA (US); Lee Douglas Shartzer, Los Angeles, CA (US); William Gibbens Redmann, Glendale, CA (US)

(73) Assignee: Thomson Licensing, Issy les Moulineauz (FR)

( * ) Notice: Subject to any disclaimer, the term of this patent is extended or adjusted under 35 U.S.C. 154(b) by 127 days.

(21) Appl. No.: 13/395,133

(22) PCT Filed: Sep. 22, 2010

(86) PCT No.: PCT/US2010/049772
§ 371 (c)(1),
(2), (4) Date: Mar. 9, 2012

(87) PCT Pub. No.: WO2011/037966
PCT Pub. Date: Mar. 21, 2011

(65) Prior Publication Data
US 2012/0173977 A1  Jul. 5, 2012

Related U.S. Application Data

(60) Provisional application No. 61/245,756, filed on Sep. 25, 2009, provisional application No. 61/245,770, filed on Sep. 25, 2009.

(51) Int. Cl.
*G06F 3/048* (2013.01)
*H04N 21/443* (2011.01)
(Continued)

(52) U.S. Cl.
CPC ....... *H04N 5/44582* (2013.01); *H04N 21/4438* (2013.01); *G06F 3/0485* (2013.01);
(Continued)

(58) Field of Classification Search
CPC ............ G06F 3/0481; G06F 17/30994; G06F 17/30572; G07F 17/3276
See application file for complete search history.

(56) References Cited

U.S. PATENT DOCUMENTS 7,970,541 B2   6/2011  Ando et al.
2002/0154157 A1* 10/2002 Sherr et al. .................... 345/716
(Continued)

FOREIGN PATENT DOCUMENTS

CN   101319908   2/2008
CN   101404152   4/2009
(Continued)

OTHER PUBLICATIONS

Shirazi, "Java Performance tuning—Chapter 4 Object Creation", Internet Citation, [Online], Retrieved from the Internet: URL:http://www.oreilly.coom/catalog/javapt/chapter/ch04.html>9-2000 retrieved—Jun. 2, 2004; pp. 1-15.
(Continued)

*Primary Examiner* — William Bashore
*Assistant Examiner* — Rayeez Chowdhury
(74) *Attorney, Agent, or Firm* — Robert D. Shedd; Vincent E. Duffy; Michael A. Pugel

(57) ABSTRACT

An apparatus and method for efficient display of, and navigation through, a large database by displaying and selecting objects, e.g., graphic elements, in a grid associated with the content of the database are provided. The method includes providing a first subset of graphic elements from a database of graphic elements, the first subset of graphic elements arranged in a grid pattern, adjusting a position of one of the graphic elements in the first subset on the display in response to a user input indicating movement of the one graphic element in a horizontal and vertical direction, and providing a second subset of graphic elements from the database of graphic elements, the second subset of graphic elements including the one graphic element in the first subset at the point central on the display.

15 Claims, 12 Drawing Sheets

(51) Int. Cl.
*G06F 3/0485* (2013.01)
*H04N 21/482* (2011.01)
*H04N 21/422* (2011.01)
*H04N 5/445* (2011.01)
*H04N 21/431* (2011.01)
*H04L 29/08* (2006.01)
*H04N 5/44* (2011.01)

(52) U.S. Cl.
CPC ...... *H04N21/482* (2013.01); *H04N 2005/4428* (2013.01); *H04N 21/42224* (2013.01); *H04N 2005/4432* (2013.01); *H04N 21/4314* (2013.01); *H04N 21/42222* (2013.01); *H04N 2005/443* (2013.01); *H04L 67/36* (2013.01)

(56) References Cited

U.S. PATENT DOCUMENTS

| | | | |
|---|---|---|---|
| 2003/0218637 A1* | 11/2003 | Sloo et al. | 345/810 |
| 2007/0013708 A1 | 1/2007 | Barcklay et al. | |
| 2007/0257915 A1 | 11/2007 | Kutaragi | |
| 2008/0079972 A1 | 4/2008 | Goodwin et al. | |
| 2009/0091547 A1 | 4/2009 | Kikuoka | |
| 2009/0153478 A1* | 6/2009 | Kerr et al. | 345/158 |
| 2009/0178008 A1* | 7/2009 | Herz et al. | 715/840 |
| 2009/0199241 A1 | 8/2009 | Unger et al. | |
| 2009/0210819 A1* | 8/2009 | Fujimoto et al. | 715/784 |

FOREIGN PATENT DOCUMENTS

| | | |
|---|---|---|
| EP | EP 1450277 | 8/2004 |
| JP | 2003223467 | 8/2003 |
| JP | 2005327314 | 10/2005 |
| JP | 2007304667 | 5/2006 |
| JP | 2007058686 | 3/2007 |
| JP | 2007272468 | 10/2007 |
| JP | 2008176895 | 7/2008 |

OTHER PUBLICATIONS

Search Report Dated Oct. 5, 2011.

* cited by examiner

APPARATUS AND METHOD FOR GRID NAVIGATION

REFERENCE TO RELATED PROVISIONAL APPLICATIONS

This application claims the benefit, under 35 U.S.C. §365 of International Application PCT/US2010/049772, filed Sep. 22, 2010, which was published in accordance with PCT Article 21(2) on Mar. 31, 2011 in English and which claims the benefit of U.S. provisional patent application No. 61/245,756 filed Sep. 25, 2009 and U.S. provisional patent application No. 61/245,770 filed Sep. 25, 2009.

TECHNICAL FIELD OF THE INVENTION

The present disclosure generally relates to digital content systems and methods for searching through a large amount of media content efficiently and in a graphical way, and more particularly, to an apparatus and method for efficient display of, and navigation through, a large database by displaying and selecting objects, e.g., graphic elements, in a grid associated with the content of the database and further selecting content based on the objects displayed.

BACKGROUND OF THE INVENTION

Home entertainment systems, including television and media centers, are converging with the Internet and providing access to a large number of available sources of content, such as video, movies, TV programs, music, etc. As a result, numerous challenges have emerged related to the display and navigating process for that accessible content.

In many instances, menu systems are set up using indicators of the available content. The indicators may be simply a tabular listing of files, documents, or website locations. A more user friendly approach may include graphics objects used as the indicators. For instance, a linear cover flow display may be used where items, such as audio album covers, are presented in a horizontal arrangement. Navigation through the grid, including portions of the database not currently displayed, is performed by indicating movement to the left or right. However, a linear cover flow display may not provide an adequate user experience for a large database of accessible content. Further, the navigation through such a large database using a linear display mechanism may also prove to be inefficient and cumbersome. Therefore, there is a need to improve the display mechanisms in order to address the display and navigation shortcomings currently present.

SUMMARY

According to one aspect of the present disclosure, a method for navigating through graphic elements on a display is provided. The method includes the steps of providing a first subset of graphic elements from a database of graphic elements, the first subset of graphic elements arranged in a grid pattern, adjusting a position of one of the graphic elements in the first subset of graphic elements on the display in response to a user input indicating movement of the one graphic element in a horizontal direction and a vertical direction, and providing a second subset of graphic elements from the database of graphic elements, the second subset of graphic elements including the one graphic element in the first subset on the display.

According to another aspect of the present disclosure, an apparatus for searching for content is provided and includes a memory that contains a plurality of graphic elements arranged in a pattern, a display interface coupled to the memory, the display interface providing a portion of the pattern to a display device such that the display device can display the portion of the pattern, a user interface that receives a user input indicating a desired movement in both horizontal and vertical directions of one of the displayed graphic elements in the provided pattern, and a controller, coupled to the user interface and the display interface, the controller adjusting a display position of the one graphic element in response to the user input, the adjustment of the display position further including the display interface providing a different portion of the pattern to the display device.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
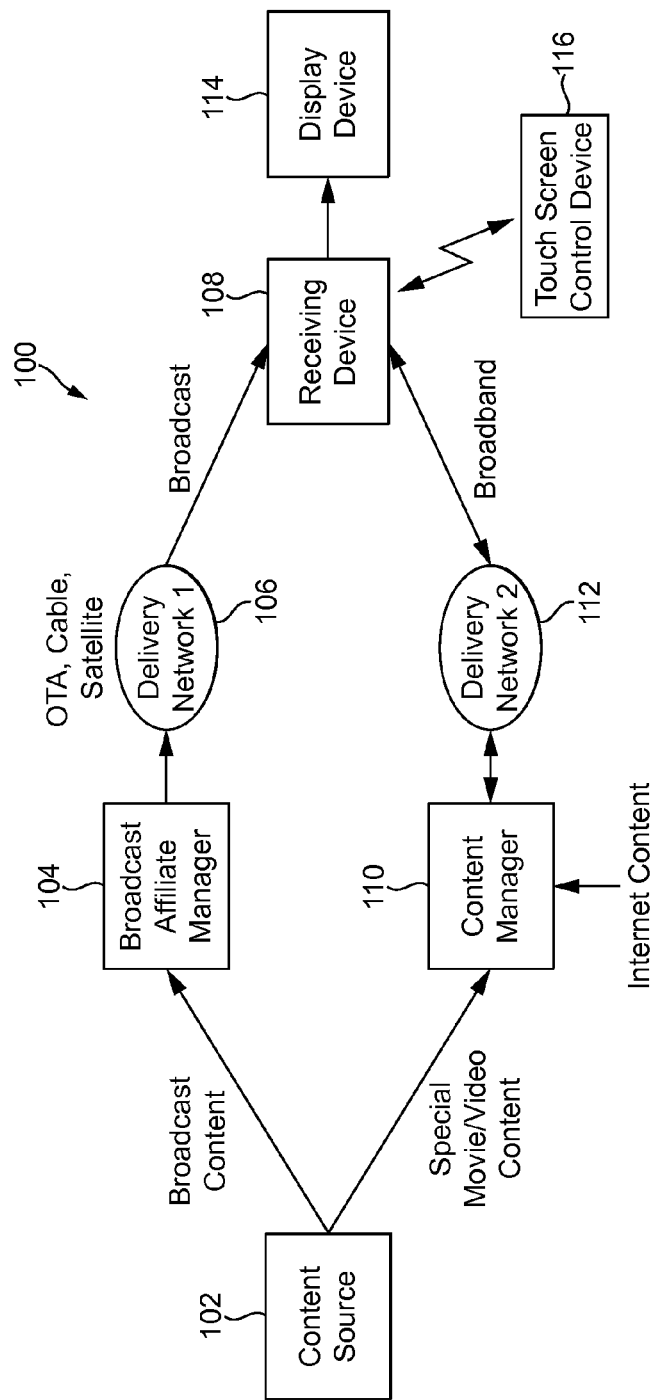
FIG. 1 is a block diagram of an exemplary system for delivering video content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The disclosed embodiments are generally related to an apparatus and method for grid navigation. The present disclosure provides for a grid display which is a graphical user interface view that enables a user to navigate a set of data elements in two dimensional space (i.e., x and y directions). The gird display may have a two dimensional (2D) pattern, e.g., columns and rows, but may take other forms. Navigation of the grid display may be accomplished using commends, such as gestures, to locate the desired element. An entry in the grid display is tapped or otherwise selected to initiate further action, e.g., executing or playing associated content. This interface mechanism is for use in media applications where items on the gird display can be represented graphically such as by audio album covers or video poster images. The particular embodiments describe an apparatus and method associated with optimizations to the view of a grid display implementation such that the number of display elements is minimized and independent of the number of items in the full dataset. The embodiments also address issues with navigation through the database so that it may be smooth and efficient with respect to the visual perception of the displayed portion. The apparatus and method may be particularly adapted for use in a content distribution network encompassing controlled access to a large database of media content.

Navigation through the user interface of the present disclosure is facilitated by a mechanism to move quickly, simply and accurately across a display, such as a television, monitor, or touch screen. In one embodiment, an input device such as a motion sensing remote controller is provided. In another embodiment, a touch screen or panel remote device is employed having the cursor on a screen essentially tracking the user's finger as they move it across the remote controller's screen. As the user passes over the grid display, the graphic elements representing content in the database move in response to the user's input where certain graphic elements disappear and new graphic elements appear. In the touch screen or panel remote device embodiment, it is to be appreciated that the touch screen or panel remote device may serve as a display device itself or may simply serve as a navigational tool. In a further embodiment, a conventional hand-held remote controller is employed using at least one button or input mechanism disposed on a surface of the remote controller to navigate the grid display.

Initially, systems for delivering various types of content to a user will be described. Subsequently, a method and user interface for searching the content in accordance with embodiments of the present disclosure will then be detailed.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box/digital video recorder (DVR), a gateway, a modem, etc. Further, the receiving device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display.

The receiving device 108 may also be interfaced to a touch screen control device 116. The touch screen control device 116 may be adapted to provide user control for the receiving device 108 and/or the display device 114. The touch screen device 116 may also be capable of displaying video content. The video content may may be graphics entries, such as user interface entries, or may be a portion of the video content that is delivered to the display device 114 The touch screen control device 116 may interface to receiving device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

Figure 2:
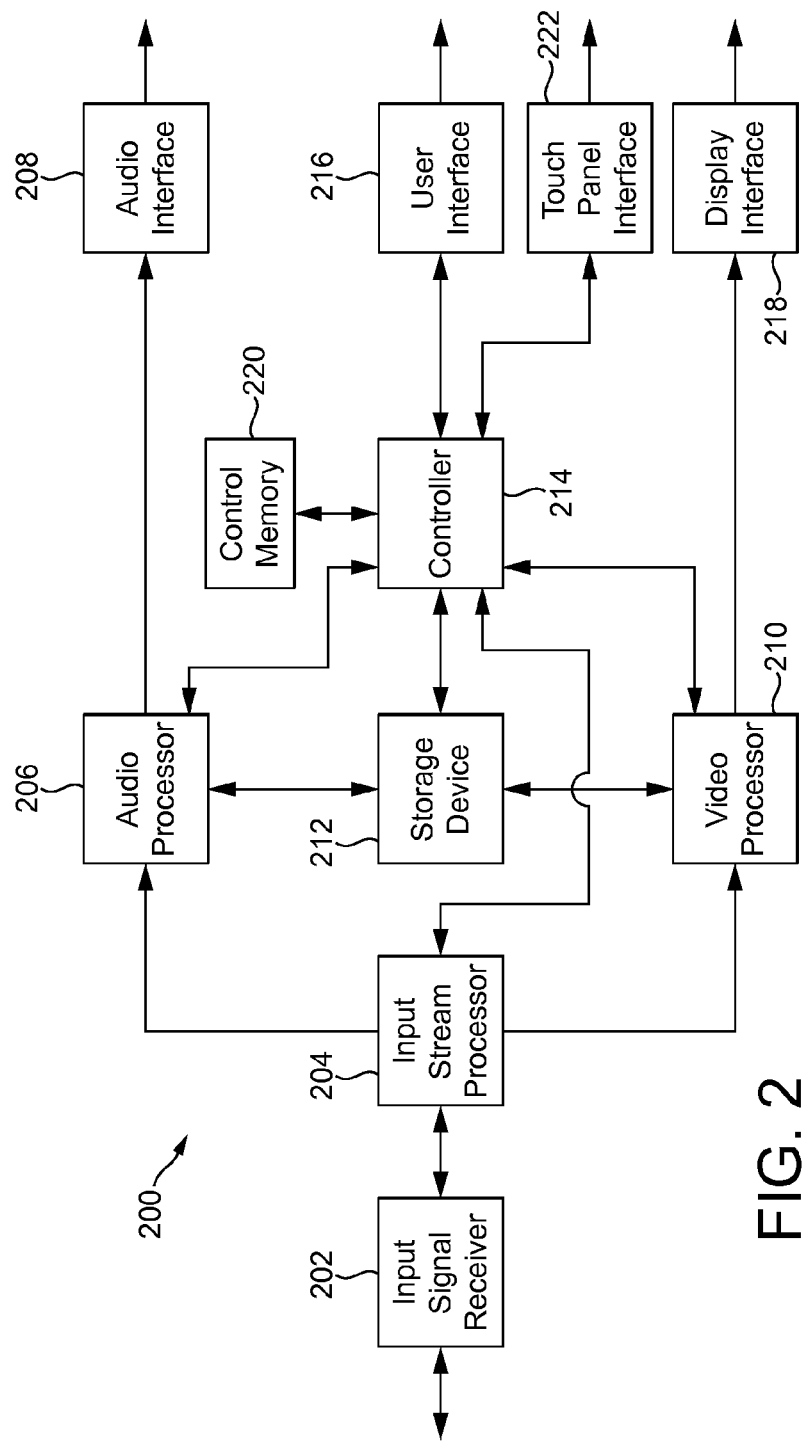
FIG. 2 is a block diagram of an exemplary receiving device in accordance with the present disclosure.

Turning now to FIG. 2, a block diagram of an embodiment of a receiving device 200 is shown. Receiving device 200 may operate similar to the receiving device 108 described in FIG. 1 and may be included as part of a gateway device, modem, settop box, or other similar communications device. The device 200 shown may also be incorporated into other systems including the display device 114 itself. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device, such as the touch screen control device 116 described in FIG. 1. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device 114 or an audio amplifier (not shown). Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content. The database may be stored as a pattern of graphic elements. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Figure 3:
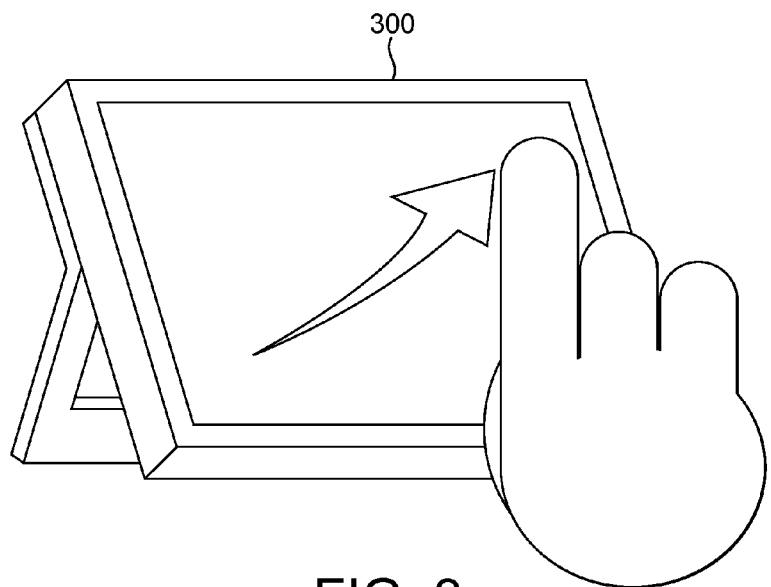
FIG. 3 is a perspective view of a touch panel in accordance with the present disclosure.

To operate effectively, the user interface process of the present disclosure employs an input device that moves a cursor around the display. To further enhance the user experience and to facilitate the display of, and navigation around, a database such as a movie library, a touch panel device 300 may be interfaced via the user interface 216 and/or touch panel interface 222 of the receiving device 200, as shown in FIG. 3. The touch panel device 300 allows operation of the receiving device or set top box based on hand movements, or gestures, and actions translated through the panel into commands for the set top box. In one embodiment, the touch panel 300 may simply serve as a navigational tool to navigate the gird display. In other embodiments, the touch panel 300 will additionally serve as the display device allowing the user to more directly interact with the navigation through the grid display of content.

Alternatively, a mouse device, a remote control with navigation features, or gesture based remote control may also be used, as will be described below.

The user interface control may be included in the receiving device 200 as part of the user interface 216, as part of the touch panel interface 222, or as part of controller 214. The user interface control incorporates features useful for display and navigation through a grid representing content in a database as well for video display of content. The user interface, and more specifically the grid user interface element, is incorporated into a video media player interface that includes scripting or programming capability for manipulation of graphics. The video media player and interface may be implemented in the receiving device 200 using any combination of hardware, software, or firmware. Alternatively, some portion of the control and video display operation may be included in the touch panel device 300 and also may be part of the information transmitted across the home the network.

Figure 4:
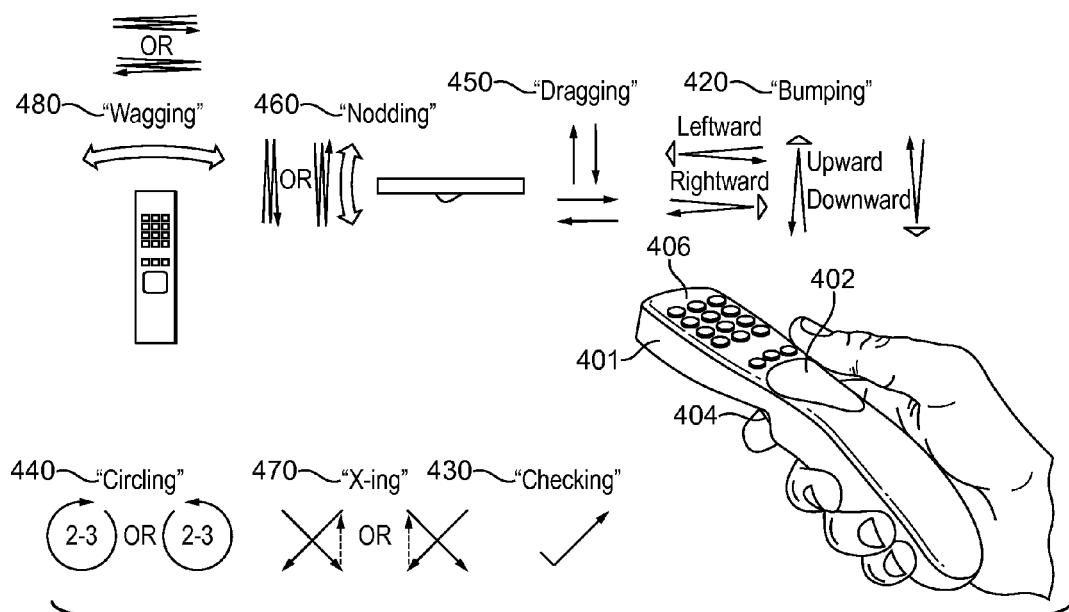
FIG. 4 includes a perspective view of a wireless hand-held angle-sensing remote controller and illustrates a number of exemplary gestures performed with the remote controller.

In another embodiment, the input device is a remote controller, with a form of motion detection, such as a gyroscope or accelerometer, which allows the user to move a cursor freely about a screen or display. An exemplary hand-held angle-sensing remote controller 401 is illustrated in FIG. 4. Remote controller 401 includes a thumb button 402, positioned on the top side of controller 401 so as to be selectively activated by a user's thumb. Activation of thumb button 402 will also be referred to as a "click," a command often associated with activation or launch of a selected function. Controller 401 further includes a trigger button 404, positioned on the bottom side of controller 401 so as to be selectively activated by a user's index (or "trigger") finger. Activation of trigger button 404 will also be referred to as a "trigger," and angular movement (i.e. pitch, yaw and/or roll) of the controller 401 while the trigger is depressed will be referred to as a "trigger-drag." A trigger-drag command is often associated with movement of a cursor, virtual cursor or other indication of the user's interactive position on the display, such as a change of state (i.e., a highlighted or outlined cell), and is commonly used to navigate in and select entries from the interactive display. Additionally, a plurality of buttons 406 are provided for entering numbers and/or letters. In one embodiment, the plurality of buttons 406 is configured similar to a telephone-type keypad.

The use of a hand-held angle-sensing remote controller, such as controller 401 described in FIG. 4, provides for a number of types of user interaction. When using an angle-sensing controller, changes in yaw map to left-and-right motions, changes in pitch map to up-and-down motions and changes in roll map to rotational motions along a longitudinal axis of the controller. These inputs are used to define gestures and the gestures, in turn, define specific contextual commands. As such, a combination of yaw and pitch can be used to define any 2-dimensional motion, such as a diagonal, and a combination of yaw, pitch and roll can be used to define any 4-dimensional motion, such as a swing. A number of gestures are illustrated in FIG. 4. Gestures are interpreted in context and are identified by defined movements of the controller 401 while the trigger button 404 is held ("trigger-drag" movements).

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while holding trigger button 404 (i.e., a "trigger drag"). The dragging gesture 450 is used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel."

In addition to traditional controls for video playback, the input device will also include a mechanism to invoke or execute at least three separate options on any element selected on the display or screen. These options will be referred to as "Additional Information", "Play" and "Additional Search". The "Additional Information", function is used to display more information about the currently selected element. The "Play" function, assuming it is available for the selected element, will select that element to be played, which may require a secondary user interface for content purchase, etc. The "Additional Search" function represents the mechanism that allows a user to use any element as a source for an additional advanced search that will generate a whole new content set, updating the entire screen based on criteria defined by the selected element. It is to be appreciated that these three options may be associated with predefined or new gestures, for example, on touch panel 300, or each option may be assigned to a predetermined button, for example, of the plurality of buttons 406 on the remote controller 401.

It is to be appreciated that at least some of the components described above in relation to FIGS. 1-4 will form an apparatus and/or system for generating the user interface.

Figure 5:
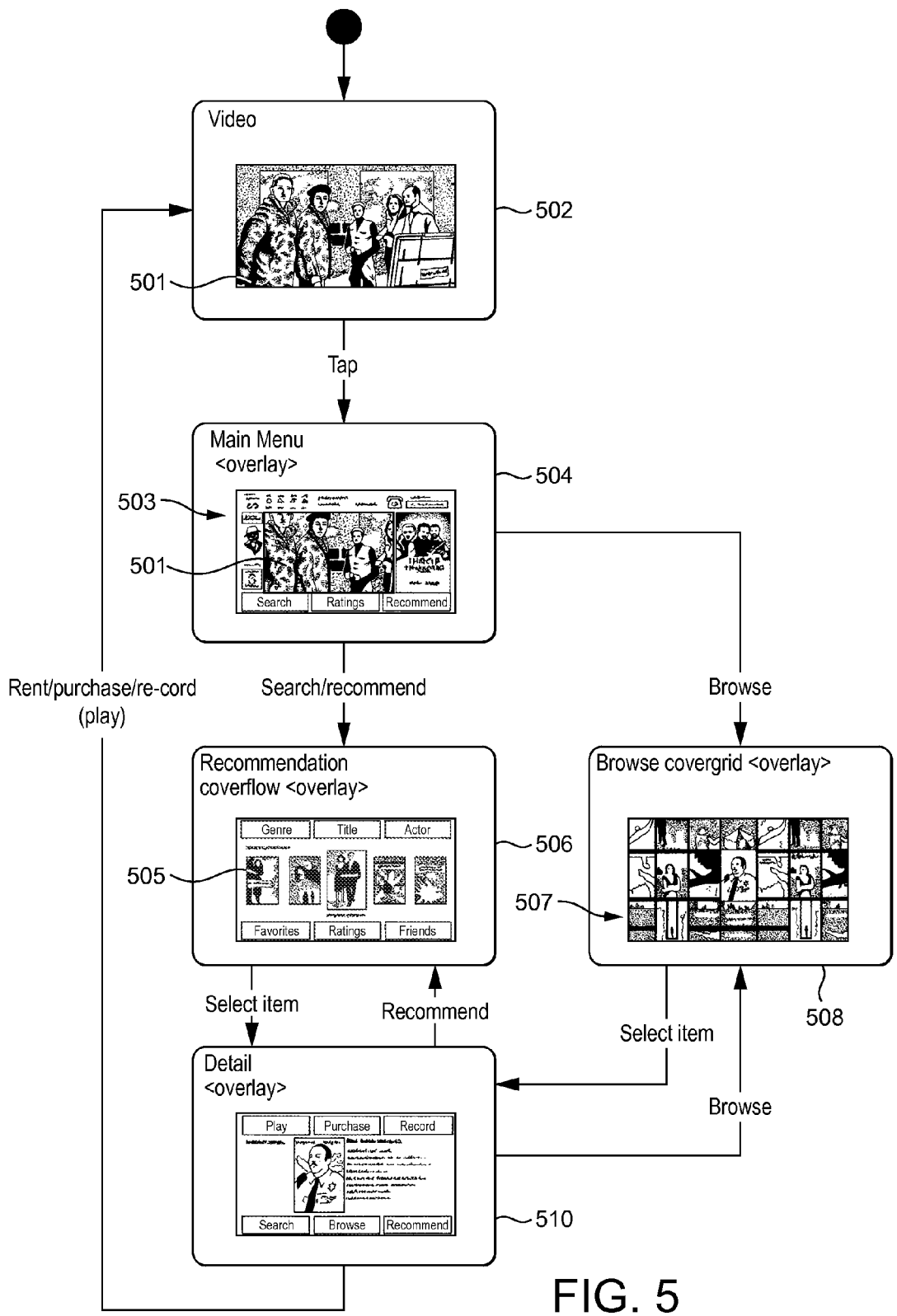
FIG. 5 is a graphical flowchart of operation of an exemplary user interface in accordance with an embodiment of the present disclosure.

FIG. 5 illustrates a graphical flowchart for the operation of a user interface related to the display and navigational aspects of the grid display of the present disclosure. Initially, video content 501, from either a broadcast source or the managed special source, may be displayed, in step 502. In step 504, entering the main menu of the interface may be accomplished by tapping the screen, selecting through a virtual button, actuating a physical button, or the like. The main menu screen may include a number of user informational elements 503, and may also include a portion of the display still displaying the previous video content 501. The video content may continue to run, or may be placed in pause mode.

Navigation into the content library may include using the search, browse, or recommend button by tapping on or otherwise selecting the desired button. In step 506, selection of the search or recommend button accesses a linear display structure 505 of certain objects within the library or database, and include additional criteria for the search or recommendation feature to restrict the coverage size of the database, including actor, genre, or title criteria. The linear grid 505 may be more useful for these access functions due to the restrictions placed on the access to the library and the reduction in searchable content.

In step 508, selecting the browse function as a navigation tool pulls up a separate two dimensional grid display 507 of content selections. The browse function provides access to the complete library or database and promotes very little restriction in navigation around the database. The grid display 507 and navigation for the library or database will be described in further detail below. An entry or selection of an element from a content display (for instance by tapping on it), after it has been highlighted or enlarged in one of the previous function operations opens a detail screen which provides further detail about the selected content entry, step 510. The detail screen also provides additional options for playing or executing, renting, recording, or buying the content as well as options to return to a previous content navigation function described above.

Figure 6:
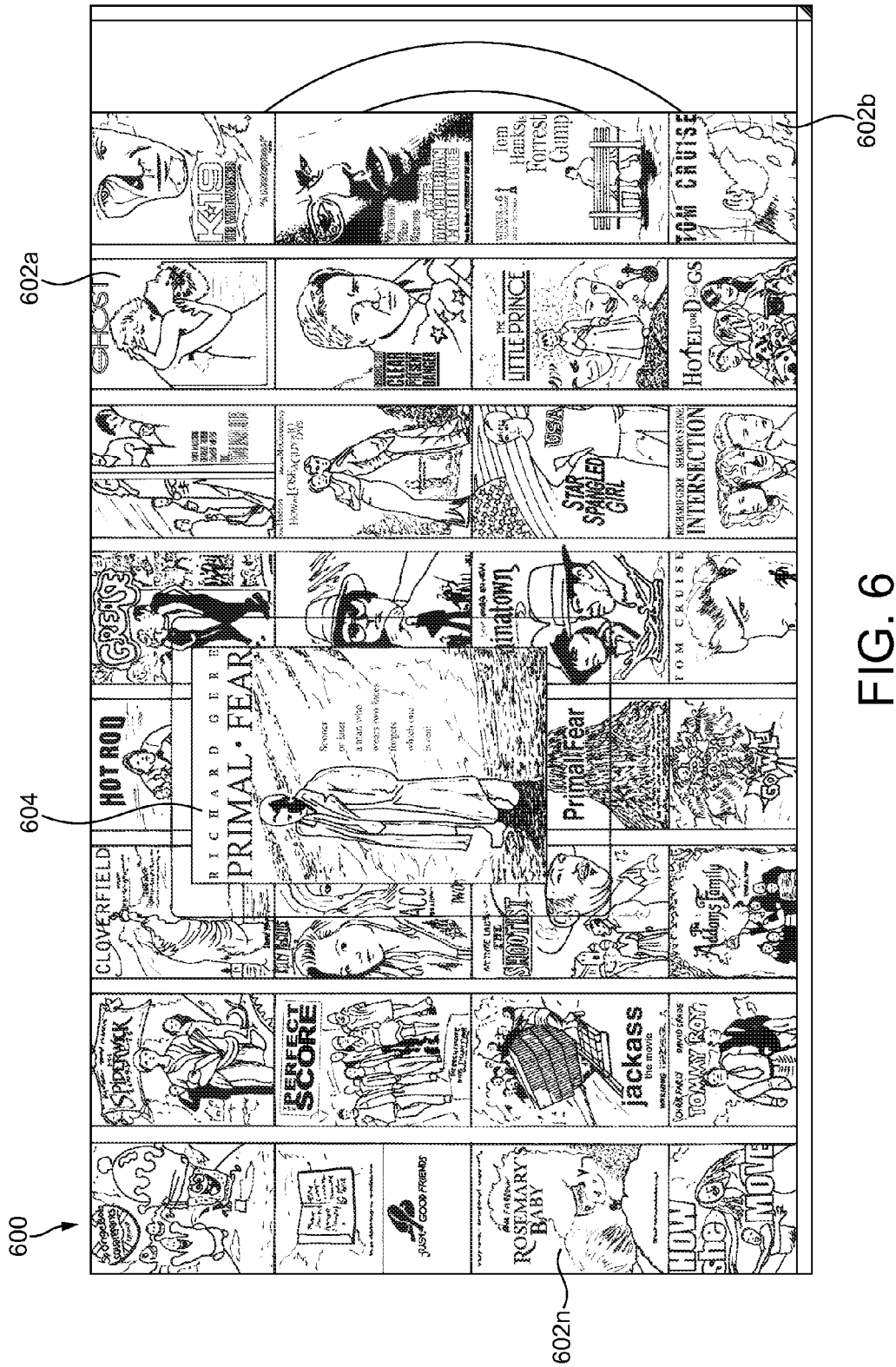
FIG. 6 illustrates an exemplary embodiment of a user interface of the present disclosure.

FIG. 6 illustrates a detail view of an embodiment of the grid display 600 using aspects of the present disclosure. Grid display 600 operates in a manner similar to the operation of grid display 507 described in FIG. 5. The grid display 600 may be displayed on the display device 114 and manipulated or navigated using the touch panel 300 or other navigation device described earlier. The interface screen may also be displayed on the touch panel device 300 as a remote display, allowing the user to more directly interact with the navigation through the grid display of content.

The grid display 600 is made up of several graphical elements 602a-602n arranged in a two dimensional grid. The two dimensional grid may include rows and columns or include some other two dimensional pattern arrangement, such as a radial or elliptical pattern around one or more central points. In one embodiment, all of the element move together as on contiguous unit. Each graphics element 602a-602n represents a single data entry location from the library or database of content, referred to as the model in the control software, which will be described below in relation to FIG. 8 below. For example, grid display 600 includes graphic elements representing movie posters. Grid displays showing graphic elements representing book covers, album or CD covers, or the like may also be used. The current item 604 is, in this case, highlighted by adjusting the appearance of the item, e.g., enlarging and centering the element in the view area. When an item is highlighted in response to a user input, additional information may be provided with the graphic element related to the specific content associated to the graphic element. Furthermore, the specific content associated with the graphic element may be executed, e.g., a movie to be played, a game to be loaded, a web site to be launched, in response to further user input.

The grid display takes advantage of screen real-estate or display area to provide additional options and context in multiple dimensions. Navigation of the grid display is not constrained to a single, typically horizontal, dimension. Data in the grid, e.g., movie content, audio content, etc., may be either arbitrarily or explicitly organized within the two dimensional space. When explicitly organized, the data or graphic elements 602a-602n are organized according to at least one variable related to the specific content associated to graphic element. For instance, rows may represent alphanumeric organization while columns may represent genres.

Any element 602a-602n may be made up of images representing specific content, such as a defined frame from a piece of recorded content, an image supplied from the network or by the user, or from a library of generic elements either manually or automatically assigned to the content. Any of these elements may be augmented with text, either overlaid on the element itself or displayed along with it, and/or additional smaller elements to indicate the type of content. For example, elements representing content that is locally stored on the receiving device, such as receiving device 108 described in FIG. 1, may be presented with a small element of a disk drive in the bottom right hand corner of a large image representing the content itself. Elements are configured to be detailed enough for a user to clearly see the type of content they represent. Elements could also be in part or fully dynamically created, such as including elements of content currently playing on a broadcast channel. For example, an element may be dynamically generated (either locally or delivered from the network) of a scene from recently broadcast video, then combined with a logo or some indication of the channel on which it currently being broadcast. This would allow a user to see at a glance, what is on currently on a large number of channels at once.

Figure 7:
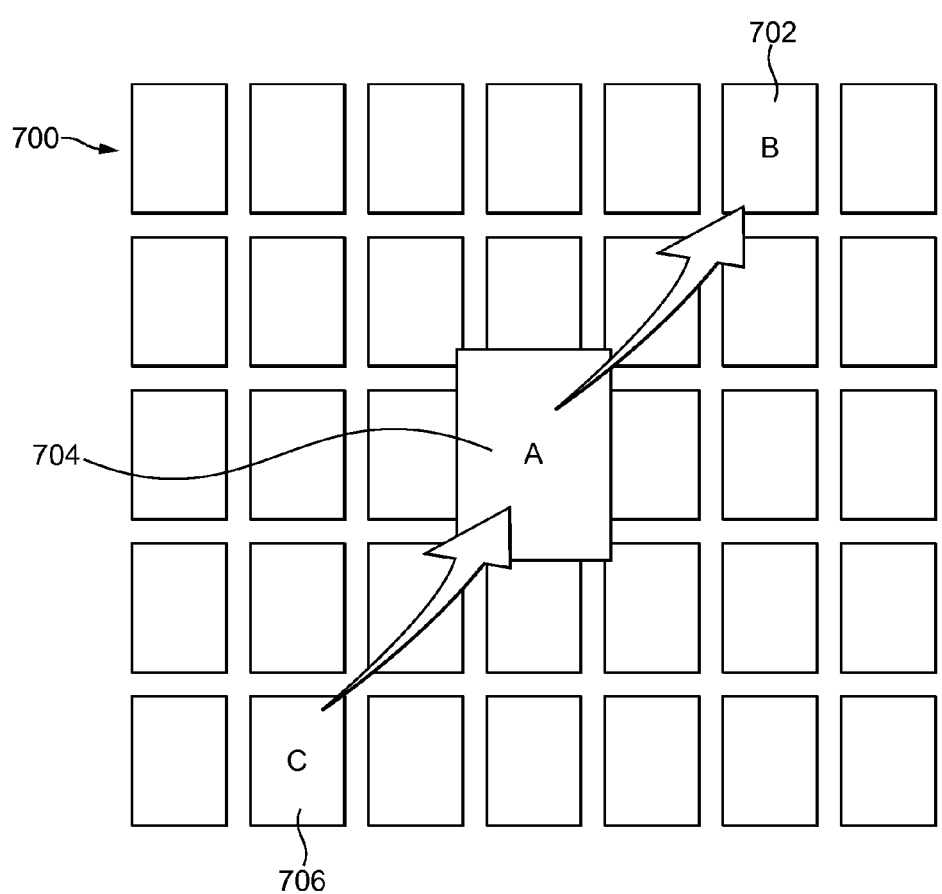
FIG. 7 illustrates user operation and navigation of a user interface in accordance with an exemplary embodiment of the present disclosure.

FIG. 7 illustrates the user operation and navigation for the grid display using aspects of the present disclosure. Interaction with the grid display 700 shown in FIG. 7 is described in connection with the touch panel device 300 shown in FIG. 3. Gestures, made by a user's hand, on, or above, the touch or capacitively sensitive panel translate to messages that are communicated to the receiving device 108 via a network, such as a home network, as described in FIG. 1. The messages are translated by a controller in the touch panel device into changes processed by the set top box or receiving device. It is important to note that the messages creating changes may be interpreted by the receiving device 108 in a manner that results in different effects within the physical data structure representing the content library (known as the model) and the display structure (known as the view) portions of the implementation.

As an example, when initiating a drag motion from lower left to upper right on the touch panel, as shown in FIG. 3, the elements of grid 700 move such that the item in position B (element 602) moves off screen of the display device toward the upper right and is replaced by the item in position A (element 704), additionally the item in position C (element 706) moves to position A, as shown in FIG. 7. Additionally, movements may be animated on the display for smooth transition. Momentum effects may also be applied to enhance the physics of the view. For instance, the rate of speed that the gesture is made may be translated into a distance that the display is shifted through the grid and/or grid display.

It is important to note that the touch panel interface is only one of possibly multiple input devices that could be used for input into the apparatus or system. For instance, the use of a hand-held angle-sensing controller, as shown in FIG. 4, provides for a number of types of user interaction based on gestures.

Figure 8:
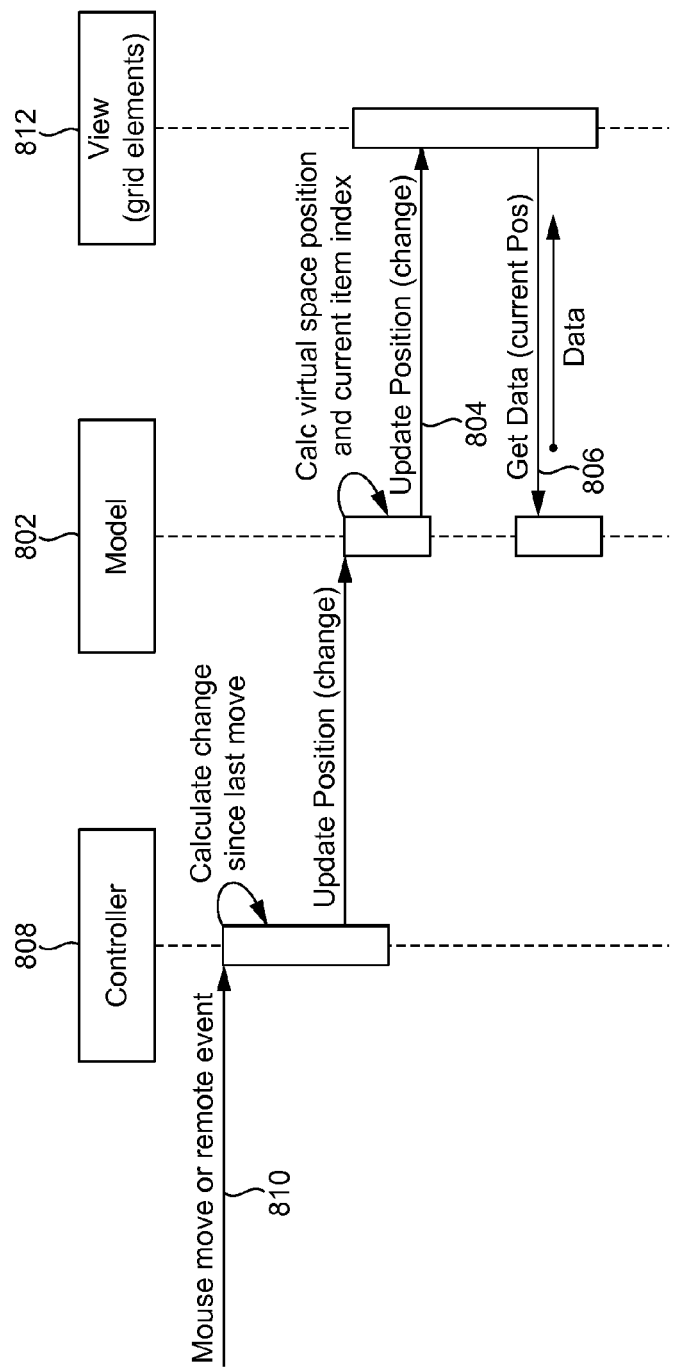
FIG. 8 illustrates a state control diagram for an exemplary embodiment of a user interface in accordance with the present disclosure.
Figure 9:
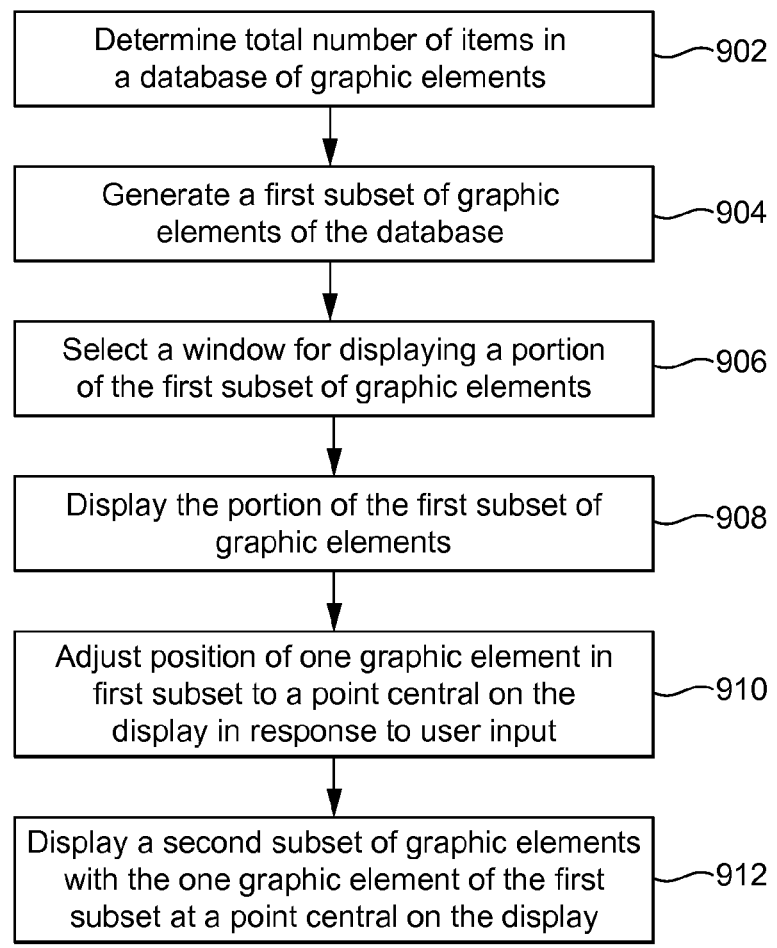
FIG. 9 is flowchart of an exemplary process for optimizing the user interface in accordance with an embodiment of the present disclosure.

FIG. 8 illustrates a state control diagram for the implementation of a grid display using aspects of the present disclosure. The implementation for the grid display and the interface follows a Model-View-Controller (MVC) coding structure. The Model portion 802, or database library, holds (or provides access to) the entire set of data and also correlates virtual x/y coordinates 804 with specific data items that are arranged in a two dimensional matrix. The Model portion 802 also tracks the currently selected item 806 within the dataset based on virtual coordinates (ideally centering the selected item when generated in the view). The Controller portion 808 converts mouse and other messages 810 (e.g. from a remote input device) into relative x/y coordinate changes that are submitted to the model which in-turn updates its virtual position 804. The View portion 812 subscribes to events from the Model 802 and generates the grid for a display based on updates. The View portion 812 includes position updates and item detail updates.

Additionally, the implementation may include a control interpreter for a remote input device such as a touch panel using gesture interaction. Messages from the remote input device are communicated via interface software and/or hardware to the grid display implementation and are interpreted by the Controller 808 for input into the Model 802.

A process for optimizing the display of the grid display and interface will be described in relation to FIGS. 9-14.

Initially, in step 902, a total number of items in a database of graphic elements is determined. The data or graphic elements are arranged in a two dimensional array which correlates to a two dimensional grid in virtual space. The extent of the virtual space depends on the height and width of the individual grid elements multiplied by the number of rows and columns of data in the data set. Additionally, the dataset need not be arranged symmetrically in the horizontal and vertical dimensions. Each data item in the data set contains at least one of an image, title, rating, and uniform resource locator (URL), and other metadata related to a specific piece of content, in the example described above, a feature film.

Figure 10:
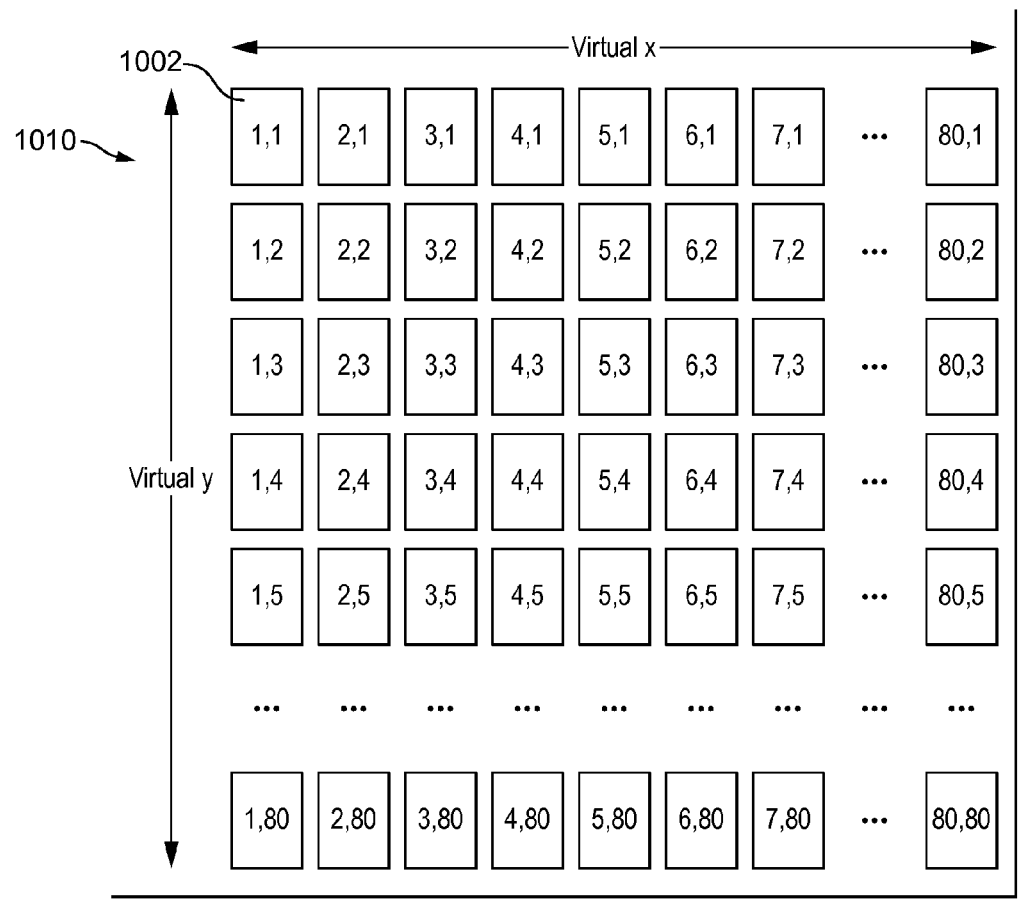
FIG. 10 illustrates two dimensional indexing for each data element of the user interface.

FIG. 10 illustrates an embodiment of a data structure 1000 using aspects of the present disclosure. Data structure 1000 may be stored and retrieved through a memory device, such as memory 220 described in FIG. 2. Data structure 1000 may include an array of a plurality of data elements arranged based on a pattern for display. For example, data structure 1000 may include a dataset of 6400 items with the data elements arranged in an array of 80 columns by 80 rows (row and column dimensions need not be identical).

Figure 11:
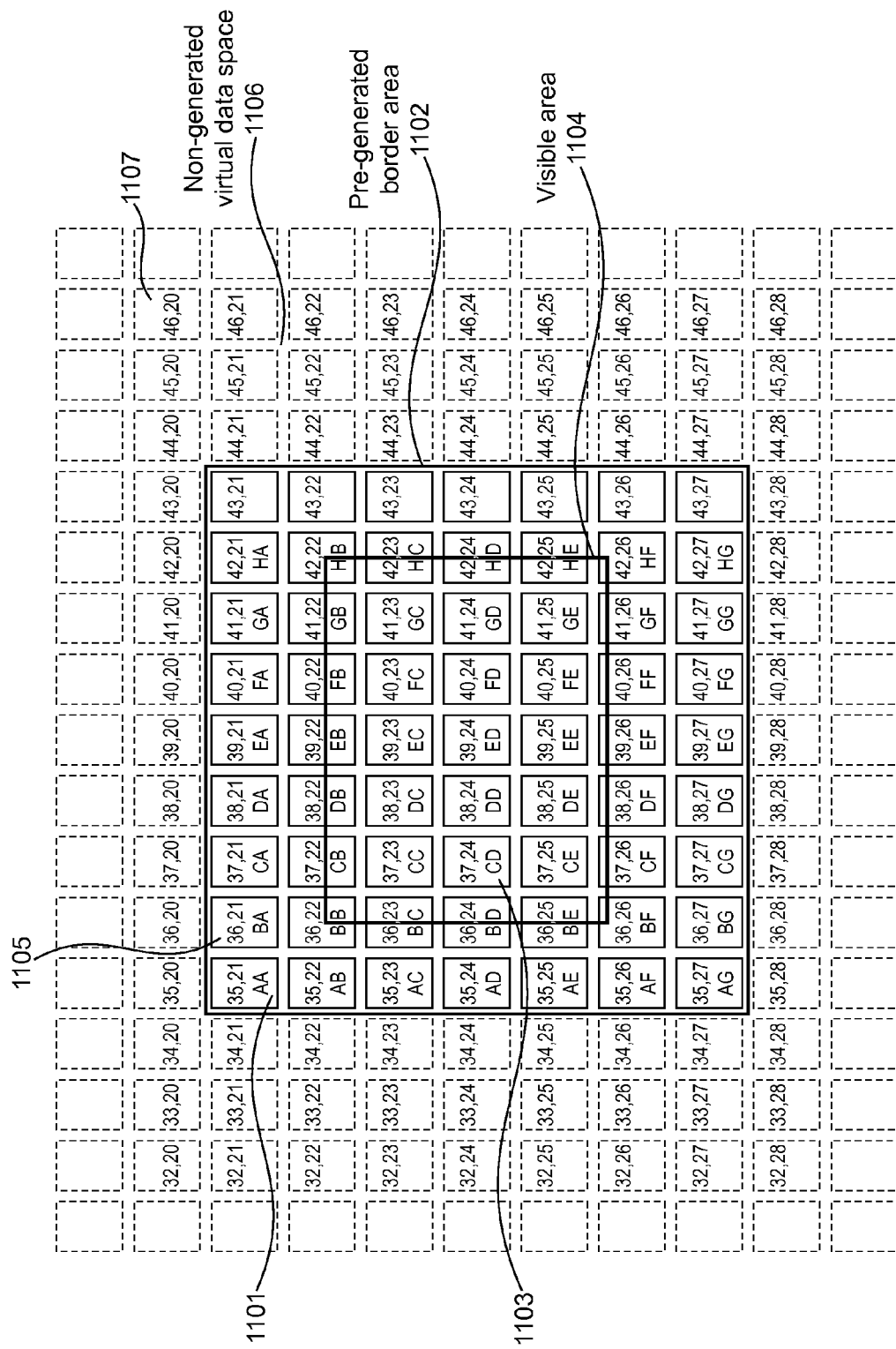
FIG. 11 illustrates a visible area window and border area of generated graphic elements for a user interface in accordance with an exemplary embodiment of the present disclosure.

Data structure 1000 illustrates the two dimensional indexing for each data element 1002 as it relates between the display area on a display and the array. As an exemplary illustration of the embodiment, the virtual dimensions for a grid containing 80×80 elements each with a visual dimension of 150×200 pixels would result in a virtual space of 12,000× 16,000 pixels. Rather than load images for all 6400 items in a plane 12,000×16,000 pixels, the method of the present disclosure would generate only a fraction of the total space, i.e., a first subset of graphic elements, step 904. This is accomplished by selecting a "window" into the dataset that constitutes the visible area plus an additional border area to facilitate enough caching to support smooth navigation into adjacent areas of the grid, step 906. FIG. 11 illustrates a single element border 1102 around the visible area 1104. As will be described in more detail below, all elements 1101 within border 1102 are generated but only the elements 1103 within the area 1104 are visible. In cases where it is desirable to catch a full screen's worth of information in any direction, to support a quick gestural move across an entire screen width, the border area 1102 could be increased.

A loading priority for the data (such as images) may be established. The images should be loaded in priority from center outward to the edge of the border 1102. When direction of movement is known, image loading priority is weighted to the elements coming into view over those leaving the view. FIG. 11 further illustrates the visible area 1104, the border area 1102 and the non-generated virtual data space 1106. Generated visual elements are labeled AA (element 1101), BA (element 1105), etc. It is to be appreciated that graphic elements, e.g., element 1107, in the virtual data space 1106 are not generated but are designated to a container or placeholder. As element 1107 enters area 1102 in response to a user input, the container will be loaded and the graphic element associated to same will be loaded or generated.

In step 908, a portion of the first subset of graphic elements will be displayed. As shown in FIG. 11, the elements in the visible area 1104 are generated and visible on the display, while the elements in the pre-generated border area 1102 are generated but not visible on the display. In step 910, the position of at least one graphic element in the first subset is adjusted to a point central on the display in response to a user input and a second subset of graphic elements is displayed with the at least one graphic element at the central point, step 912. It is to be appreciated that as the elements are moved, elements in the border area 1102 will appear quickly in the visible area 1104 since there are already generated. For example, if a user selected element CE (37, 25) and dragged the element diagonally to the upper right, at least element GC (41, 23) would move into the border area 1102 and out of the visible area. Additionally, at least element AG (35, 27) will move from border area 1102 to visible area 1104, the transition appearing seamless since element AG was already generated and cache in the border area.

Figure 12:
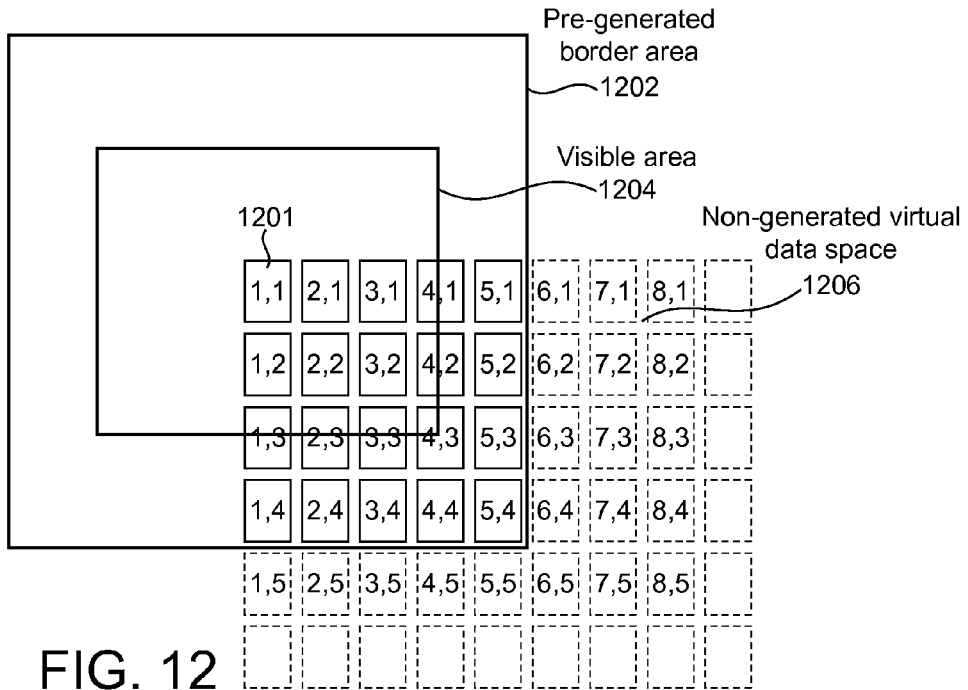
FIG. 12 illustrates a view of a user interface in accordance with an exemplary embodiment of the present disclosure.

Special exceptions may be handled, such as in the case where an edge or corner data is approached. The grid display should be configured to avoid navigating beyond the edge. The terminal position for an edge should ideally be centered in the view (and emphasized as the selected item), as illustrated in FIG. 12. FIG. 12 includes a pre-generated border area 1202, visible area 1204, and non-generated virtual data space 1206 similar to those areas described above in FIG. 11. Additionally, element 1, 1 (element 1201) is centered in the visible area 1004. Even if the user attempts to select element 1, 1 (element 1201) and move in a direction toward the lower right hand corner of the display, the elements will stay in the same position, or be locked. In this manner, the user input will not result in a blank screen.

Figure 13:
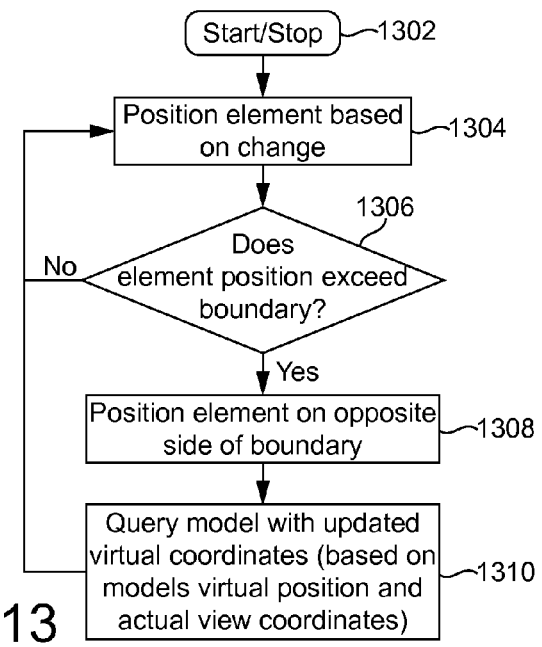
FIG. 13 is flowchart of an exemplary process for optimizing the user interface in accordance with another embodiment of the present disclosure.

FIG. 13 is a flow chart of the optimization process for displaying a portion of a larger database or library in a grid display using aspects of the present disclosure. FIG. 13 will be described primarily with respect to FIG. 11. The optimization involves reusing visual elements rather than allocating and de-allocating them as needed. In step 1302, the method starts and proceeds to position an element based on a change, step 1304, i.e., in response to a user input. In step, 1306, it is determined if the element's position exceeds the boundary area 1102. When a display element moves outside the pre-generated border area 1102, the element is moved to the opposite edge of the border area, step 1308. In step 1310, the view element queries the model for data relevant to its new position in virtual space. The virtual space location is determined by the current virtual location offset by the actual display coordinates.

Figure 14:
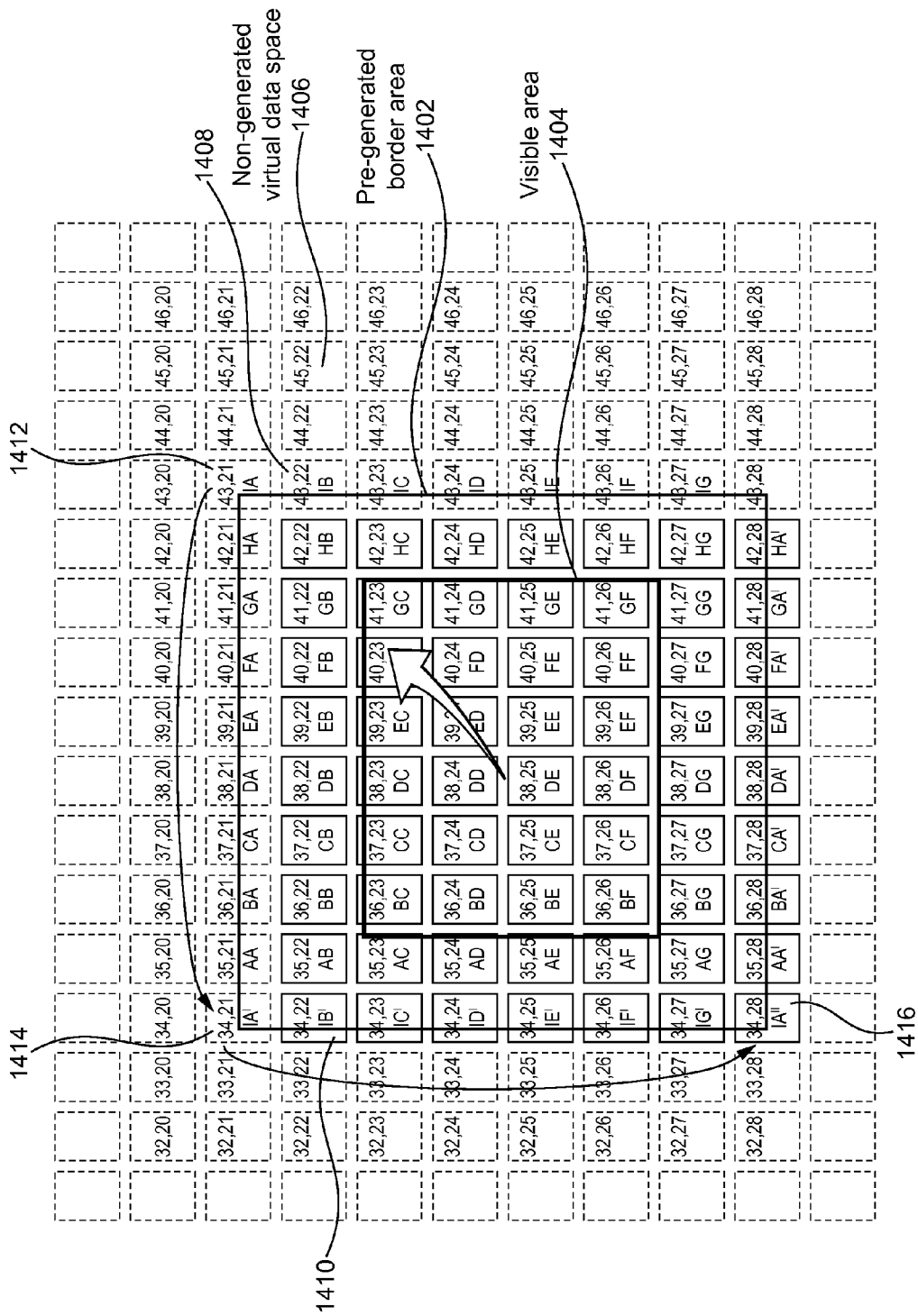
FIG. 14 illustrates movement of graphic elements in a grid of a user interface in accordance with an exemplary embodiment of the present disclosure.

FIG. 14 shows an illustrative embodiment of the movement of the display elements in the grid display following a response to a user input to shift the window of displayed elements with the database or library. The display diagram includes a pre-generated border area 1402, visible area 1404, and non-generated virtual data space 1406 similar to those areas described above in FIG. 11. The display diagram illustrates how visual elements on the top and right side shift to the bottom and left side to fill in as the grid is moved in a diagonal direction. For example, element IB 1408 on the right shifts physical position to IB' 1410 on the left. As part of this transition the visual element queries the model to obtain data relevant to the new virtual position (in the case of IB' 1410 that would be data element 34, 22). In the case of visual element IA 1412 there are actually two moves, one from right to left resulting in IA' 1414 and another from the top to the bottom resulting in final location of IA" 1416. In this manner, when an element moves into the border area 1402, it is moved to another position in the border area so the underlying container or placeholder for the data or graphic element does not need to be unloaded. The container will be re-used but only the graphic element would need to be loaded which is less resource intensive than having to load a new container.

The grid display of the present disclosure may be used to browse multiple hundreds or even thousands of items, e.g., items representing content associated with movies. Generating a visual element for each element can be processor intensive. The techniques of the present disclosure provide for minimizing the number of display elements required for generating a grid display view while maintaining the illusion of navigating a larger virtual space of information.

An embodiment of exemplary software code that represents an implementation of aspects of the present disclosure is provided below. The first section of code is main.as. Main.as is the main class for the application and is where the Model, View, and Controller software components are interconnected.

```
MAIN
import mx.utils.Delegate;
import flash.geom.Point;
dynamic class Main extends MovieClip {
        // Constants:
        public static var CLASS_REF = Main;
        public static var LINKAGE_ID:String = "Main";
        //Event Constants: Controllers will use these to Receive events from the
application
        public static var SHOWMAINMENU = "ShowMainMenu";
        public static var SHOWVIDEO = "ShowVideo";
        public static var VIDEOCLICK = "VideoClick";
        public static var SHOWACTOR = "ShowActor";
        public static var SHOWFAVORITES = "ShowFavorites";
        public static var SHOWFRIENDS = "ShowFriends";
        public static var SHOWGENRE = "ShowGenre";
        public static var SHOWDETAIL = "ShowDetail";
        public static var SHOWRATINGS = "ShowRatings";
        public static var SHOWTITLE = "ShowTitle";
        public static var SHOWRECOMMEND = "ShowRecommend";
        public static var SHOWBROWSE = "ShowBrowse";
        public static var SHOWSEARCH = "ShowSearch";
        public static var SHOWPURCHASE = "ShowPurchase";
        public static var ADDRECOMMEND = "AddRecommend";
        public static var SHOWRENT = "ShowRent";
        public static var SHOWRECORD = "ShowRecord";
        public static var SHOWGRID = "ShowGrid";
        public static var PLAYMOVIE = "PlayMovie";
        public static var STARTVIDEO = "StartVideo";
        // Public Properties:
        public static var mainRef:Main;
```

```
            public var coverGrid_model:CoverGridModel;
            public static var coverGrid_controller:CoverGridController;
            public var coverGrid_view:CoverGridView;
            // Private Properties:
            private var mainMenu_mc:MainMenu;
            private var recommendationMenu_mc:RecommendationMenu;
            public static var recommendationMenu_controller:RecommendationMenuController;
            private var recommendationMenu_view:RecommendationMenuView;
            private var recommendationMenu_model:CoverGridModel;
            private var coverGridStage_mc:MovieClip;
            private var detailMenu_mc:DetailMenu;
            private var detailMenu_controller:DetailMenuController;
            private var videoPlaceholder_mc:MovieClip;
            private var videoController:VideoController;
            private var stbServer:STBSocketServer20;
            private var config:XML;
            private var mainApp_model:MainAppModel;
            private var mainMenu_view:MainMenuView;
            private var mainMenu_controller:MainMenuController;
            private var downTime:Date;
            private var clickThreshold:Number = 170;
            private var moveXThreshold:Number = 20;
            private var moveYThreshold:Number = 10;
            private var isMenuVisible:Boolean = false;
            private var mousePoint:Point;
            private var clientWidth:Number;
            private var clientHeight:Number;
            // UI Elements:
            // Initialization:
            public function Main( )
            {
                    mainRef = this;
                    AsBroadcaster.initialize(this);
                    clientWidth = Stage.width;
                    clientHeight = Stage.height;
                    mousePoint = new Point( );
                    //get app configfile
                    config = new XML( );
                    config.onLoad = Delegate.create(this,configLoaded);
                    config.ignoreWhite = true;
                    config.load("config.xml");
                    //-- covergrid --
                    var gridElementSize:Point = new Point(150,200);
                    var selectedItemOffset:Point = new Point(5,3);
                    coverGrid_model = new CoverGridModel(gridElementSize,
selectedItemOffset);
                    coverGrid_controller = new CoverGridController(coverGrid_model);
                    coverGrid_view = new
CoverGridView(coverGridStage_mc.stage_mc,coverGrid_model,coverGrid_controller,11,7,-
1,-1);
                    coverGrid_model.addObserver(coverGrid_view);
                    //wire up covergrid events
                    this.addListener(coverGrid_controller);
                    coverGrid_controller.addListener(this);
                    //-- main menu --
                    mainApp_model = new MainAppModel( );
                    mainMenu_controller = new MainMenuController(MainAppModel);
                    this.addListener(mainMenu_controller);
                    mainMenu_controller.addListener(this);
                    trace("main listeners:"+this._listeners);
                    mainMenu_view = new
MainMenuView(mainMenu_mc,mainApp_model,mainMenu_controller);
                    //-- video --
                    trace("calling video controller constructor:"+videoPlaceholder_mc);
                    videoController = new VideoController(videoPlaceholder_mc);
                    this.addListener(videoController);
                    videoController.addListener(this);
                    trace("Video Placeholder listener:"+videoController._listeners);
                    //-- Recommendation menu --
//                  //****************
                    gridElementSize = new Point(150,200);
                    selectedItemOffset = new Point(5,0);
                    recommendationMenu_model = new CoverGridModel(gridElementSize,
selectedItemOffset);
                    recommendationMenu_model.isSingleRow = true;
                    recommendationMenu_controller = new
RecommendationMenuController(recommendationMenu_mc, recommendationMenu_model);
                    recommendationMenu_controller.yAxisIsClamped = true;
                    recommendationMenu_view = new
```

-continued

```
RecommendationMenuView(recommendationMenu_mc.stage_mc,recommendationMenu_model,recommendation
Menu_controller,11,1,-0.2,1.7);
//                //****************
                this.addListener(recommendationMenu_controller);
                recommendationMenu_controller.addListener(this);
                //-- Detail menu --
                detailMenu_controller = new DetailMenuController(detailMenu_mc);
                this.addListener(detailMenu_controller);
                detailMenu_controller.addListener(this);
                //-- start by showing video ==
                ShowVideo( );
                trace("main Constructor");
        }
        private function onLoad( ):Void { configUI( ); }
        // Public Methods:
        // Private Methods:
        private function configUI( ):Void { }
        private function configLoaded(success:Boolean) {
                trace(success+" ConfigXML:"+config);
                if (success) {
                        var node:XMLNode = config.firstChild.firstChild;
                        var datalocation:String;
                        var cacheCommand:String;
                        while (node != null) {
                                switch (node.nodeName) {
                                        case "socketserver":
                                                stbServer = new
STBSocketServer20(node.attributes.server, Number(node.attributes.port));
                                                trace("event object:"+stbServer.event);
                                                stbServer.addListener(this);
                                                trace("_listerners:"+stbServer._listeners);
                                                break;
                                        case "datalocation":
                                                trace("loading:"+node.attributes.url);
                                                datalocation = node.attributes.url;
                                                break;
                                        case "cachecommand":
                                                cacheCommand = node.attributes.value;
                                                break;
                                }
                                node = node.nextSibling;
                        }
                        if (cacheCommand != null) {
                                coverGrid_model.CacheCommand = cacheCommand;
                                recommendationMenu_model.CacheCommand = cacheCommand;
                        }
                        if (datalocation != null) {
                                coverGrid_model.load(datalocation);
                                recommendationMenu_model.load(datalocation);
                        }
                        trace("STBApp created");
                }
        }
        //display functions
        public function hide( ) {
                isMenuVisible=false;
                this.broadcastMessage(ControllerEvent20.HIDE);
        }
        public function VideoClick( ) {
                if (!coverGrid_controller.isVisible) {
                        trace("Main Video Click:"+ coverGrid_controller.isVisible);
                        if (isMenuVisible) {
                                //ShowVideo( );
                        } else {
                                ShowMainMenu( );
                        }
                }
        }
        public function ShowMainMenu( )
        {
                trace("ShowMainMenu called:"+this);
                isMenuVisible=true;
                this.broadcastMessage(ControllerEvent20.HIDE);
                this.broadcastMessage(SHOWMAINMENU);
        }
        private function ShowVideo( )
        {
                isMenuVisible=false;
                this.broadcastMessage(ControllerEvent20.HIDE);
```

```
        }
        private function ShowRecommend( )
        {
                trace("Main recieving ShowRecommend, broadcasting");
                isMenuVisible=true;
                this.broadcastMessage(ControllerEvent20.HIDE);
                this.broadcastMessage(SHOWRECOMMEND);
        }
        private function ShowBrowse( )
        {
                isMenuVisible=true;
                this.broadcastMessage(ControllerEvent20.HIDE);
                this.broadcastMessage(SHOWGRID);
        }
        private function ShowDetail($data:Object)
        {
                isMenuVisible=true;
                this.broadcastMessage(ControllerEvent20.HIDE);
                this.broadcastMessage(SHOWDETAIL,$data);
        }
        public function ShowSearch( )
        {
                isMenuVisible=true;
                this.broadcastMessage(ControllerEvent20.HIDE);
                this.broadcastMessage(SHOWGRID);
        }
                public function clientdimention(e:STBEventDimensionData20) {
                //trace("Setting client dimensions width:"+e.Width+"
height:"+e.Height);
                clientWidth = e.Width;
                clientHeight = e.Height;
        }
        public function ShowRent( ) {
                hide( );
        }
        public function PlayMovie($videoUrl:String) {
                ShowVideo( );
        this.broadcastMessage(STARTVIDEO,$videoUrl);
                trace("broadcasting:"+STARTVIDEO+" Play movie:"+$videoUrl);
        }
        public function mousedown($e:STBEventMouseData20) {
//              trace("MAIN mouse down x:"+$e.stageX+" y:"+$e.stageY);
//              downTime = new Date( );
//              mousePoint.x = $e.stageX;
//              mousePoint.y = $e.stageY;
//              moveSample.x = $e.stageX;
//              moveSample.y = $e.stageY;
        }
        public function drag($e:STBEventMouseData20) {
                var movePoint:Point = new Point($e.stageX,$e.stageY);
                trace("Broadcast move X:"+movePoint.x+" y:"+movePoint.y);
                this.broadcastMessage(ControllerEvent20.MOVEXY, movePoint);
        }
        private function moveCheck(point:Point, thresholdX:Number, thresholdY:Number)
{
                trace("move check x:"+Math.abs(point.x)+" y:"+Math.abs(point.y)+"
thresholdX:"+thresholdX+" moveSample:"+moveSample);
                if (Math.abs(point.x) > thresholdX && Math.abs(point.x) >
Math.abs(point.y)) {
                        if (point.x > 0) {
                                //trace("broadcast move right delta:"+delta+"
point:"+point);
                                this.broadcastMessage(ControllerEvent20.MOVERIGHT);
                        }
                        if (point.x < 0) {
                                this.broadcastMessage(ControllerEvent20.MOVELEFT);
                        }
                }
                if (Math.abs(point.y) > thresholdY && Math.abs(point.y) >
Math.abs(point.x)) {
                        if (point.y > 0) {
                                this.broadcastMessage(ControllerEvent20.MOVEDOWN);
                        }
                        if (point.y < 0 ) {
                                //trace("broadcast move up delta:"+delta+"
point:"+point);
                                this.broadcastMessage(ControllerEvent20.MOVEUP);
                        }
                }
```

```
        }
        public function mouseup($e:STBEventMouseData20) {
                trace("MAIN mouse up x:"+$e.stageX);
                moveCheck(new Point($e.stageX,$e.stageY),0,0);
                this.broadcastMessage(ControllerEvent20.MOVEEND);
        }
        public function serverSelect(e:STBEventMouseData20) {
                        this.broadcastMessage(ControllerEvent20.SELECT);
        }
        public function servermenu(e:STBEventMenuData20) {
                if (isMenuVisible) {
                        this.broadcastMessage(ControllerEvent20.HIDE);
                        isMenuVisible = false;
                } else {
                        this.broadcastMessage(SHOWMAINMENU);
                        isMenuVisible = true;
                }
        }
        public function command(e:STBEventCommandData20) {
                fscommand(e.Command, e.Arg);
                trace("running fscommand");
                fscommand("quit");
                //fscommand("quit");
        }
}
```

CoverGridView.as and Placeholder.as comprise the view in the MVC pattern. The Placeholder object represents the individual elements on the screen and it is the class that subscribes to, and communicates with the model.

```
PLACEHOLDER
import mvc.*;
import util.*;
import flash.geom.Point;
import mx.utils.Delegate;
class Placeholder extends MovieClip implements Observer {
        // Constants:
        public static var CLASS_REF = Placeholder;
        public static var LINKAGE_ID:String = "Placeholder";
        // Public Properties:
        public var controllerRef:CoverGridController;
        // Private Properties:
        private var __minX:Number;
        private var __maxX:Number;
        private var __minY:Number;
        private var __maxY:Number;
        private var __maxWidth:Number;
        private var __maxHeight:Number;
        private var __cols:Number;
        private var __rows:Number;
        private var __dataIndex:Point;
        private var __title:String;
        private var __imageURL:String;
        private var __imageHolder:MovieClip;
        private var __imageLoader:MovieClipLoader;
        private var __loadListener:Object;
        private var __isCurrentItem:Boolean;
        // UI Elements:
        private var placeholderRectangle:MovieClip;
        private var __label_txt:TextField;
        private var placeholderHighlight:PlaceHolderHighlight;
        // Initialization:
        public function Placeholder( )
        (
                //trace("Placeholder constructor called");
                //set boundaries
                __minX = 0;
                __minY = 0;
                __dataIndex = new Point( );
                __imageURL = "";
                __imageHolder =
this.createEmptyMovieClip("imageHolder",this.getNextHighestDepth( ));
                __isCurrentItem = false;
                __maxWidth = 150 * .96;
                __maxHeight = 200 * .96;
                __imageHolder.__x = -(__maxWidth/2);
                __imageHolder.__y = -(__maxHeight/2);
```

```
                _imageLoader = new MovieClipLoader( );
                _loadListener = new Object( );
                _loadListener.onLoadInit = Delegate.create(this,resizePoster);
                //_loadListener.onLoadStart = Delegate.create(this, onLoadStart);
                _loadListener.onLoadError = Delegate.create(this, onLoadError);
                _imageLoader.addListener(_loadListener);
                //_placeholderHighlight =
PlaceHolderHighlight(this.attachMovie("PlaceholderHighlight","_placeholderHighlight"
,this.getNextHighestDepth( )));
                placeholderHighlight._visible = false;
                //_placeholderHighlight.swapDepths(_imageHolder ); //put it behind the
image
                //this.cacheAsBitmap = true;
        }
        public function set columns ($cols:Number):Void
        {
                this._cols = $cols;
                _maxX = _cols * 150;
        }
        public function set rows ($r:Number):Void
        {
                this._rows = $r;
                _maxY = _rows * 200;
        }
        private function onLoad( ):Void { configUI( ); }
        // Public Methods:
        public function update (o:Observable, $infoObj:Object):Void
        {
                //trace("Placeholder.update called");
                if($infoObj == undefined) return; //short circuit if bad data
                // Cast the generic o:Observable to the LoveFilmModel datatype.
                var m:CoverGridModel = CoverGridModel(o);
                updateViewPosition($infoObj.change);
                // get info from the model based on where we are in grid space
                _dataIndex.x = $infoObj.vPos.x + _x;
                _dataIndex.y = $infoObj.vPos.y + _y;
                //trace("Placeholder.update $infoObj.vPos.x/y:" +
$infoObj.vPos.toString( ) + "_dataIndex.x/y:" + _dataIndex.toString( ));
                var data = m.getData(_dataIndex);
                _title = data.itemTitle;
                if(_title == "")
                {
                        //trace("declaring " + _name + " invisible" + " _title:" +
_title + " _imageURL:" + _imageURL + " data:" + data);
                        this._visible = false;
                }
                else
                {
                        this._visible = true;
                        //emphasize current item
                        if(data.isCurrent)
                        {
                                if(!_isCurrentItem)
                                {
                                        //This is an optimization to avoid reanimating the
placeholder
                                        // put on the highest level of all the peers
                                        var highestDepthItem =
_parent.getInstanceAtDepth(_parent.getNextHighestDepth( )-1);
                                        this.swapDepths(highestDepthItem );
                                        Tween.to(this,.2,{_xscale:180,_yscale:180 }); //,
onComplete:Delegate.create(this,highlightItem) });
                                        highlightItem( );
                                }
                                _isCurrentItem = true;
                        }
                        else
                        {
                                if( _xscale != 100) //don't bother tweening if we're
already at 100%
                                {
                                        unHighlightItem( );
                                        Tween.to(this,.1,(_xscale:100,_yscale:100));
                                }
                                _isCurrentItem = false;
                        }
                        var indicator:String = "";
                        if(_isCurrentItem)
                        {
```

-continued

```
                        indicator = "*"
                }
                __label__txt.text = data.pos.x + ":" + data.pos.y + " " +
indicator + " " + data.itemTitle;
                if(__imageURL != data.posterURL)
                {
                        //trace("loading new poster data.PosterURL:" +
data.posterURL);
                        __imageURL = data.posterURL;
                        __imageLoader.loadClip(__imageURL,__imageHolder);
                }
        }
}
// Private Methods:
private function configUI( ):Void { }
private function updateViewPosition($change:Point):Void
{
        var newX = __x + $change.x;
        var newY = __y + $change.y;
        if (newX < __minX)
        {
                //this calc might be costly
                var deltaX = Math.abs(Math.abs(__minX) – Math.abs(newX));
                newX = __maxX−deltaX;
        }
        if(newX > __maxX)
        {
                var deltaX = newX – __maxX;
                newX = __minX + deltaX;
        }
        if(newY < __minY)
        {
                var deltaY = Math.abs(Math.abs(__minY) – Math.abs(newY));
                newY = __maxY−deltaY;
        }
        if(newY > __maxY)
        {
                var deltaY = newY – __maxY;
                newY = __minY + deltaY;
        }
        __x = newX;
        __y = newY;
}
private function onLoadStart(target:MovieClip)
{
        trace("loading image for:" + __name);
}
private function onLoadError(target:MovieClip, errorCode:String,
httpStatus:Number)
{
        //trace("onLoadError with imageURL:"+ __imageURL);
//      trace(">> loadListener.onLoadError( )");
//      trace(">> =========================");
//      trace(">> errorCode: " + errorCode);
//      trace(">> httpStatus: " + httpStatus);
        //retry
        __imageLoader.loadClip(__imageURL,__imageHolder);
}
private function resizePoster (target:MovieClip, httpStatus:Number) {
        //trace("calling resize poster:"+target+" height:"+target.__height+"
width:"+target.__width);
        if (target.__height != __maxHeight) {
                target.__height = __maxHeight;
        }
        if (target.__width != __maxWidth) {
                target.__width = __maxWidth;
        }
        //target.cacheAsBitmap = true;
}
private function highlightItem( ):Void
{
        placeholderHighlight.titleText.text = __title;
        placeholderHighlight.__alpha = 100;
        placeholderHighlight.__visible = true;
        Tween.from(placeholderHighlight,.2,{__alpha:0});
}
private function unHighlightItem( ):Void
{
        placeholderHighlight.__visible = false;
```

```
                    Tween.killTweensOf(placeholderHighlight);
        }
        public function highlightOn( ):Void
        {
                    placeholderRectangle._xscale = 105;
                    placeholderRectangle._yscale = 105;
        }
        public function highlightOff( ):Void
        {
                    placeholderRectangle._xscale = 100;
                    placeholderRectangle._yscale = 100;
        }
}
VIEW
import mvc.*;
import util.*;
import flash.display.*;
import flash.net.URLRequest;
import mx.utils.Delegate;
class CoverGridView extends AbstractView
{
        // Constants:
        public static var CLASS_REF = CoverGridView;
        // Public Properties:
        // Private Properties:
        private var viewStage:MovieClip;
        private var rows:Number;
        private var columns:Number;
        private var totalItems:Number;
        private var itemList:Array;
        // Initialization:
        public function CoverGridView(target, model, controller, columns,rows, columnOffset, rowOffset)
        {
                    super(model, controller);
                    trace("CoverGridView constructor called for controller:"+controller);
                    //create an empty movie clip to attach placeholders to. This way any changes in scaling of target don't badly affect anything.
                    viewStage = target.createEmptyMovieClip("viewStage", target.getNextHighestDepth( ));
                    viewStage.cacheAsBitmap = true;
                    viewStage._x = 155 * columnOffset; //get width from placeholders or have placehoder get width from here. or get from/pass to model.
                    viewStage._y = 205 * rowOffset;
                    this.rows = rows;
                    this.columns = columns;
                    populateStage( );
                    //Need to call static reference to get around fact that events won't preserve the instance reference when assigning controller.onMouseMove for example.
//                  viewStage.onMouseMove = Delegate.create(controller,onMouseMove);
//                  viewStage.onMouseDown = Delegate.create(controller,onMouseDown);
//                  viewStage.onMouseUp = Delegate.create(controller,onMouseUp);
                    viewStage.onMouseMove = function( )
                    {
                                Main.coverGrid_controller.onMouseMove( );
                    }
                    viewStage.onMouseDown = function( )
                    {
                                Main.coverGrid_controller.onMouseDown( );
                    }
                    viewStage.onMouseUp = function( )
                    {
                                Main.coverGrid_controller.onMouseUp( );
                    }
        }
        // Public Methods:
        public function update (o:Observable, infoObj:Object):Void
        {
                    //trace("CoverGridView.update called");
                    var m:CoverGridModel = CoverGridModel(o);
        }
        public function defaultController (model:Observable):Controller {
                    trace("defaultController called for CoverGridView");
                    return new CoverGridController(model);
        }
        public function getVisible( ):Boolean {
                    return viewStage._parent._parent._visible;
        }
        public function setVisible(Value:Boolean):Void {
```

```
                //trace("Setting covergrid view:"+Value);
                viewStage._parent._parent._visible = Value;
        }
        // Private Methods:
        private function populateStage( )
        {
                trace("CoverGridView.populateStage called");
                //setup the two-dimensional array
                itemList = new Array(rows);
                for(var r=0;r<rows;r++)
                {
                        itemList[r] = new Array(columns);
                }
                //fill it in
                for(var r = 0; r<rows;r++)
                {
                        for (var c = 0; c<columns; c++)
                        {
                                //trace("r:" + r + "c:" + c );
                                var ref = "p_" + r + "_" + c;
                                itemList[r][c] =
viewStage.attachMovie("Placeholder",ref,viewStage.getNextHighestDepth( ));
                                itemList[r][c]._x = c*150; // c*itemList[r][c]._width; //
                                itemList[r][c]._y = r*200; //r*itemList[r][c]._height;
                                itemList[r][c].setModel(model);
                                itemList[r][c].columns = columns;
                                itemList[r][c].rows = rows;
                                model.addObserver(itemList[r][c]);
                        }
                }
        }
}
```

CoverGridModel.as is the data source for the application, it also tracks virtual coordinate space. Adjustments are made to the position in space using a call to updatePos passing in a "change" parameter.

```
MODEL
import util.Observable;
import flash.geom.Point;
import mx.utils.Delegate;
dynamic class CoverGridModel extends Observable
{
        // Constants:
        public static var CLASS_REF = CoverGridModel;
        //
        //public static var GRID_ELEM_WIDTH = 150;
//      public static var GRID_ELEM_HEIGHT = 200;
//      public static var CURRENT_ITEM_OFFSETX = 5;
//      public static var CURRENT_ITEM_OFFSETY = 3;
        // Public Properties
        // Private Properties:
        private var _data:Array;
        private var fileCache:FileCache;
        private var cacheCommand:String;
        private var cacheRow:Number;
        private var cacheCol:Number;
        private var _change:Point;
        private var _dataFile:XML;
        private var _gridElementSize:Point;
//      private var _columnBuffer:Number;
        private var _rowBuffer:Number;
        private var _selectedItemOffset:Point;
        private var _canShowCurrent:Boolean;
                private var _virtualPos:Point;
        private var _virtualMin:Point;
        private var _virtualMax:Point;
        private var _currentItemIndex:Point;
        private var _isSingleRow:Boolean;
        // Initialization:
        public function CoverGridModel($gridElementSize:Point,
$selectedItemOffset:Point)
        {
                //trace("CoverGridModel constructor");
                _canShowCurrent = true;
```

```
                __gridElementSize = $gridElementSize;
                __selectedItemOffset = $selectedItemOffset;
                __change = new Point(0,0);
                __virtualPos = new Point(0,0);
                //stop virtual min before it goes to the next row.
                __virtualMin = new Point(- ((__gridElementSize.x *
__selectedItemOffset.x)),- ((__gridElementSize.y * __selectedItemOffset.y)) ); //
                __virtualMax = new Point(0,0);// limits depend on data set
//              __columnBuffer = __gridElementSize.x * 2;
//              __rowBuffer = gridElementSize.x * 2;
                __currentItemIndex = new Point(0,0);
                //set app datafile
                __dataFile = new XML( );
                __dataFile.onLoad = Delegate.create(this,dataLoaded);
                __dataFile.ignoreWhite = true;
                __isSingleRow = false;
        }
        // Public Methods:
        public function get isSingleRow( ):Boolean
        {
                return __isSingleRow;
        }
        public function set isSingleRow($setting:Boolean):Void
        {
                __isSingleRow = $setting;
        }
        public function getData($pos:Point)        {
                var index:Point = new Point( );
                index.x = Math.floor($pos.x/__gridElementSize.x);
                index.y = Math.floor($pos.y/__gridElementSize.y);
                //trace("CovertGridMode.getData( ) index.x/y:" + index.toString( ) + "
$pos.x/y:" + $pos.toString( ) + " grid w/h:" + __gridElementSize.toString( ) + "this:"
+ this);
                var isCurrent:Boolean = false;
                if (index.equals(__currentItemIndex) && __canShowCurrent)
                {
                        isCurrent = true;
                        //trace("Current $pos:"+$pos);
                }
                var posterURL:String = "";//"http://72.172.68.70/images/contents/ppc-
35206-cover__5-1-i.jpg";
                var title:String = ""; //"Title";
                if (__data[index.y][index.x]!= null) {
                        posterURL = __data[index.y][index.x].posterUrl;
                        title = __data[index.y][index.x].title;
                        //trace("getting data x:"+index.x+" y:"+index.y+"
data:"+data.length+" poster:"+data[index.y][index.x].posterUrl);
                }
                return (pos:index, isCurrent:isCurrent, posterURL:posterURL,
itemTitle:title);
        }
        public function getSelected( ):Object
        {
                return __data[__currentItemIndex.y][__currentItemIndex.x];
        }
        public function get gridElementSize( ):Point
        {
                return __gridElementSize.clone( );
        }
        public function get virtualPos( ):Point //This is read-only
        {
                return __virtualPos.clone( ); //don't want anyone to directly manipulate
this object
        }
        public function updatePos($change:Point):Void
        {
                //trace("CoverGridModel.updatePos $change:" + $change.toString( ));
                //trace("CoverGridModel.updatePos $change came in as NaN");
                if(isNaN($change.x) )
                {
                        $change.x = 0;
                }
                if(isNaN($change.y))
                {
                        $change.y = 0;
                }
                if(($change.x == 0) && ($change.y == 0))
                {
                        return;
```

```
                    }
                    $change.x = Math.floor($change.x);
                    $change.y = Math.floor($change.y);
                    __virtualPos.offset(-$change.x, -$change.y);
                    __change = $change;
                    clampXYValues( );
                    //trace("CoverGridModel.updatePos (after clamp) __change:" +
__change.toString( ));
                    calculateCurrentItemIndex( );
                    updateObservers( );
            }
            public function getLastChange( ):Point
            {
                    return __change;
            }
            public function load($URL:String):Void
            {
                    trace("CoverGridModel.load(" + $URL + ") called");
                    //load data from URL
                    __dataFile.load($URL);
            }
            public function showCurrent( ) {
                    __canShowCurrent = true;
                    updateObservers( );
            }
            public function hideCurrent( ) {
                    __canShowCurrent = false;
                    updateObservers( );
            }
            // Private Methods:
            public function dataLoaded($success:Boolean) {
                    trace("dataLoaded success:" + $success);
                    if ($success) {
                            trace("Loading data
children:"+__dataFile.firstChild.childNodes.length+"
sqrt:"+Math.round(Math.sqrt(__dataFile.firstChild.childNodes.length)));
                            var maxwidth:Number; //This is the max width of the data array
row.
                            //*****************
                            //
                            if(__isSingleRow)
                            {
                                    maxWidth = __dataFile.firstChild.childNodes.length;
                            }
                            else
                            {
                                    maxWidth =
Math.round(Math.sqrt(__dataFile.firstChild.childNodes.length));
                            }
                            //*****************
                            //__virtualMax = new Point(maxWidth + __columnBuffer,maxWidth +
__rowBuffer);
                            var maxX = (maxWidth - __selectedItemOffset.x - 1) *
__gridElementSize.x;
                            var maxY = (maxWidth - __selectedItemOffset.y - 1) *
__gridElementSize.y;
                            __virtualMax = new Point(maxX, maxY);
                            var pX:Number = maxX/2 - (__selectedItemOffset.x *
__gridElementSize.x);
                            var pY:Number = maxY/2 - (__selectedItemOffset.y *
__gridElementSize.y);
                            __virtualPos.x = pX;
                            //__virtualPox.y = pY;
                            trace("__virtualPos:" + __virtualPos.toString( ) + " __virtualMax:"
+ __virtualMax.toString( ));
                            //__virtualPos = new
Point(__selectedItemOffset.x*__gridElementSize.x + (__gridElementSize.x/2),
__selectedItemOffset.y*__gridElementSize.y + (__gridElementSize.y/2));
                            var node:XMLNode = __dataFile.firstChild.firstChild;
                            var dataArray:Array = new Array( );
                            var idx:Number =0;
                            var row:Array = new Array( );
                            while (node != null) {
                                    var dataNode:Object;
                                    switch (node.nodeName) {
                                            case "entry":
                                                    dataNode = {title:node.attributes.title,
duration:node.attributes.duration,
copyright:node.attributes.copyright,
```

```
                releaseDate:node.attributes.releaseDate,
                genre:node.attributes.genre,
                rating:node.attributes.rating,
                actors:node.attributes.actors,
                director:node.attributes.director,
                synopsis:node.attributes.synopsis,
                posterUrl:node.attributes.posterUrl,
                videoUrl:node.attributes.videoUrl};
                                        break;
                        }
                        row[idx] = dataNode;
                        node = node.nextSibling;
                        idx++;
                        if (idx == maxWidth) {
                                dataArray[dataArray.length] = row;
                                row=new Array( );
                                idx = 0;
                        }
                }
                if (row.length>0) {
                        dataArray[dataArray.length] = row;
                }
                trace("data loaded rows:"+dataArray.length+" width:"+dataArray[0].length);
                __data = dataArray;
                cacheRow = 0;
                cacheCol =0;
                //cacheData( );
                calculateCurrentItemIndex( );
                updateObservers( );
        }
    }
    private function updateObservers( ):Void
    {
        //trace("updateObservers called");
        setChanged( );
        //trace("CoverGridModel.updateObservers( ) __change.x/y:" + __change.x +
"/" + __change.y + " vPos.x/y:" + __virtualPos.x + "/" + __virtualPos.y);
        notifyObservers({change:__change, vPos:__virtnalPos});
    }
    private function clampXYValues( )
    {
        //trace("clampXYValues (before) __virtualPos:" + __virtualPos.toString( )
+ " __virtualMax:" + __virtualMax.toString( ));
        var startPos:Point = new Point(__virtualPos.x,__virtualPos.y);
        var delta:Number;
        if(__virtualPos.x > __virtualMax.x)
        {
                delta = __virtualPos.x - __virtualMax.x;
                __virtualPos.x = __virtualMax.x;
                __change.x += Math.floor(delta);
        }
        else if (__virtualPos.x < __virtualMin.x)
        {
                delta = __virtualMin.x-__virtualPos.x;
                __virtualPos.x = __virtualMin.x;
                __change.x -= Math.floor(delta);
                //trace("Clamping min x virtualMin.x:"+__virtualMin.x+" __virtualPos.x:"+__virtualPos.x+" change.x:"+__change. x);
        }
        if(__virtualPos.y > __virtualMax.y)
        {
                delta = __virtualPos.y - __virtualMax.y;
                __virtualPos.y = __virtualMax.y;
                __change.y += Math.floor(delta);
        }
        else if (__virtualPos.y < __virtualMin.y)
        {
                delta = __virtualMin.y -__virtualPos.y;
                __virtualPos.y = __virtualMin.y;
                __change.y -= Math.floor(delta);
        }
//              if (startPos.x != __virtualPos.x || startPos.y != __virtualPos.y) {
//                      //clamped test values
//                      trace("clampXYValues (after) x/y:" + __virtualPos+" __virtualMax:"+__virtualMax+" __virtualMin:"+__virtualMin);
//              }
    }
    private function calculateCurrentItemIndex( ):Void
```

-continued

```
        {
                //determine currently selected item by row/col index
                _currentItemIndex.x = Math.floor(_virtualPos.x/_gridElementSize.x) +
_selectedItemOffset.x;
                _currentItemIndex.y = Math.floor(_virtualPos.y/_gridElementSize.y) +
_selectedItemOffset.y;
        }
        public function cacheData( ):Void
        {
                if (cacheRow < _data.length)
                {
                        if (cacheCol < _data[cacheRow].length)
                        {
                                trace("Cache file row:"+cacheRow+" col:"+cacheCol+"
url:"+_data[cacheRow][cacheCol].posterUrl);
                fileCache.cacheFile(_data[cacheRow][cacheCol],"posterUrl");
                        }
                }
        }
        public function filecached( ) {
                trace("Cached newUrl:"+_data[cacheRow][cacheCol].posterUrl);
                cacheCol ++;
                if (cacheCol == _data[cacheRow].length) {
                        cacheCol = 0;
                        cacheRow++;
                }
                cacheData( );
        }
        public function set CacheCommand(Value:String):Void
        {
                cacheCommand = Value;
                //set app fileCache
                fileCache = new FileCache(cacheCommand);
                fileCache.addListener(this);
        }
}
```

CoverGridController.as translates user entry moves or events, such as the gestures or touches in a capactive touch panel or gesture remote control, into changes that are sent to the model. It also add some physics to movements using animations to provide an "inertial feel" to the navigation.

```
CONTROLLER
import mvc.*;
import util.*;
import flash.geom.Point;
import mx.utils.Delegate;
dynamic class CoverGridController extends AbstractController implements
IEventController
{
        // Constants:
        public static var CLASS_REF = CoverGridController;
        private static var CLICKTIMEOUT:Number = 120;
        private static var MOVETHRESHOLD:Number = 10;
        // Public Properties:
        // Private Properties:
        private var mouseIsDown:Boolean = false;
        private var originalPos:Point;
        private var clickPos:Point;
        private var hasMoved:Boolean = false;
        private var changeTween:Tween;
        private var positionTween:Tween;
        private var tweenChangeValues:Point;
        private var tweenPositionCoords:Point;
        private var _yAxisIsClamped:Boolean;
        private var downTime:Date;
        // Initialization:
        public function CoverGridController ($cm:Observable) {
                super($cm);
                AsBroadcaster.initialize(this);
                originalPos = new Point( );
                clickPos = new Point( );
                tweenChangeCoords = new Point( );
                tweenPositionCoords = new Point( );
                trace("CoverGridController constructor called");
```

```
            __clampY = false;
    }
    // Public Methods:
    public function set yAxisIsClamped($setting:Boolean):Void
    {
            __yAxisIsClamped = $setting;
    }
    public function get yAxisIsClamped( ):Boolean
    {
            return __yAxisIsClamped;
    }
    public function onMouseMove( )
    {
            if (isVisible)
            {
                    if(mouseIsDown)
                    {
                            var currentPos:Point = new Point( );
                            currentPos.x = Math.floor(__xmouse);
                            currentPos.y = Math.floor(__ymouse);
                            var change:Point = new Point( );
                            change = currentPos.subtract(originalPos);
                            if(__yAxisIsClamped)
                            {
                                    change.y = 0;
                            }
                            //***************
                            //trace("CoverGridController.onMouseMove updatePos
change:" + change.toString( ));
                            CoverGridModel(getModel( )).updatePos(change);
                            originalPos = currentPos;
                            var comp:Point = clickPos.subtract(currentPos);
                            if (Math.abs(comp.x) > MOVETHRESHOLD || Math.abs(comp.y)
> MOVETHRESHOLD) {
                                    hasMoved = true;
                            }
                    }
            }
    }
    public function onMouseUp( )
    {
        trace("CoverGridController.onMouseUp called");
            mouseIsDown = false;
            if (!hasMoved)
            {
                    select( );
            }
            else
            {
                    finishMove( );
            }
    }
    public function onMouseDown( )
    {
            if (isVisible)
            {
                    mouseIsDown = true;
                    hasMoved = false;
                    originalPos.x = __xmouse;
                    originalPos.y = __ymouse;
                    downTime = new Date( );
                    startNewMove( );
            }
    }
    //===========
    public function moveUp( ) {
    }
    public function moveDown( ){
    }
    public function moveLeft( ) {
    }
    function moveRight( ) {
    }
    function moveXY($e:Point) {
            if (isVisible) {
                    if(__yAxisIsClamped)
                    {
                            $e.y = 0;
                    }
```

```
                    CoverGridModel(getModel( )).updatePos($e);
            }
    }
    function moveEnd( ) {
            finishMove( );
    }
    function select( )
    {
            if (isVisible)
            {
                    setTimeout(Delegate.create(this,processSelect),30);
            }
    }
    function processSelect( )
    {
            trace("Covergrid controller processSelect");
            this.broadcastMessage(Main.SHOWDETAIL,CoverGridModel(getModel( )).getSelected(
));
    }
    function hide( ) {
            view.setVisible(false);
    }
    function show( ) {
            trace("Showing Grid:"+view);
            view.setVisible(true);
    }
    function ShowGrid( ) {
            show( );
    }
    function get isVisible( ):Boolean {
            return view.getVisible( );
    }
    // Private Methods:
    private function startNewMove( ):Void
    {
            var complete:Boolean = true;
            Tween.killTweensOf(tweenChangeValues, complete);
            Tween.killTweensOf(tweenPositionCoords);
    }
    private function finishMove( ):Void
    {
            tweenChangeValues = CoverGridModel(getModel( )).getLastChange( );
            if((tweenChangeValues.x == 0 ) && (tweenChangeValues.y == 0))
            {
                    return;
            }
            var targetX:Number = tweenChangeValues.x/20;
            var targetY:Number = tweenChangeValues.y/20;
            var time:Number = 1;
            var thresholdX:Number = 10;
            var thresholdY:Number = 10;
            //trace("finishMove tweenChangeValues:" + tweenChangeValues.toString( )
+ " thresholdX/Y:" + thresholdX);
            if((Math.abs(tweenChangeValues.x) < thresholdX) &&
(Math.abs(tweenChangeValues.y) < thresholdY))
            {
                    time = .1;
            }
            changeTween = Tween.to(tweenChangeValues,time,{x:targetX, y:targetY,
onUpdate:Delegate.create(this,tweenChangeUpdateHandler),
onComplete:Delegate.create(this, tweenChangeCompleteHandler)});
    }
    private function tweenChangeUpdateHandler( ):Void
    {
            //trace("CoverGridController.tweenChangeUpdateHandler
tweenChangeValues:" + tweenChangeValues.toString( ));
            CoverGridModel(getModel( )).updatePos(tweenChangeValues);
    }
    private function tweenChangeCompleteHandler( ):Void
    {
            //trace("CoverGridController.tweenChangeCompleteHandler called");
            var m:CoverGridModel = CoverGridModel(getModel( ));
            tweenPositionCoords = m.virtualPos;
            // figure out target x and y values
```

```
                var posX:Number = Math.floor(tweenPositionCoords.x %
m.gridElementSize.x);
                var offsetX:Number;
                var thresholdX:Number = Math.floor(m.gridElementSize.x/2);
                if (posX > thresholdX)
                {
                        offsetX = Math.floor(thresholdX – posX);
                )
                else
                {
                        offsetX = –Math.floor(posX – thresholdX);
                }
                var posY:Number = Math.floor(tweenPositionCoords.y –
Math.floor(Math.floor(tweenPositionCoords.y/ m.gridElementSize.y) *
m.gridElementSize.y));
                var offsetY:Number;
                if(m.isSingleRow)
                {
                        offsetY = 0;
                }
                else
                {
                        var thresholdY:Number = Math.floor(m.gridElementSize.y/2)
                        if (posY > thresholdY)
                        {
                                offsetY = Math.floor(thresholdY – posY);
                        }
                        else
                        {
                                offsetY = –Math.floor(posY – thresholdY);
                        }
                }
                var targetX = Math.floor(tweenPositionCoords.x + offsetX);
                var targetY = Math.floor(tweenPositionCoords.y + offsetY);
                positionTween = Tween.to(tweenPositionCoords,1,{x:targetX,y:targetY,
onUpdate:Delegate.create(this,tweenPositionHandler), ease:Regular.easeInOut });
        }
        private function tweenPositionHandler( ):void
        {
                //Update the model with the new coordinates
                //trace("CoverGridController.tweenPositionHandler called
tweenPositionCoords:" + tweenPositionCoords.toString( ));
                var chg:Point =
CoverGridModel(getModel( )).virtualPos.subtract(tweenPositionCoords);
                CoverGridModel(getModel( )).updatePos(chg);
        }
}
```

Described herein is an apparatus and method for displaying and navigating through a database or library of elements representing available content. The elements may be image objects such as album covers or movie posters. The structure arranges the objects in a grid display for taking advantage of the two dimensions of a display, i.e, the vertical dimension along with the horizontal dimension, for navigation purposes. The navigation aspects associated with the user interface include gesture based movements translated into display changes for the cover grid. Optimizations to the view of a grid display implementation are described such that the number of display elements is minimized and independent of the number of items in the full dataset and that navigation through the database is smooth and efficient with respect to the visual perception of the displayed portion.

Although embodiments which incorporate the teachings of the present disclosure have been shown and described in detail herein, those skilled in the art can readily devise many other varied embodiments that still incorporate these teachings. Having described preferred embodiments of an apparatus, method and user interface for grid navigation (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for navigating through graphic elements on a display, comprising the steps of:
    providing a first set of graphic elements from a database of graphic elements, the first set of graphic elements arranged in a grid pattern in a first predefined area, the first predefined area including a second predefined area for displaying a portion of the first set of graphic elements, the graphic elements in the first predefined area but outside of the second predefined area not being visible on the display, each of the graphic elements comprising an image associated with at least one of a video and audio program;
    adjusting a position of one of the graphic elements in the first set of graphic elements in the second predefined area on the display in response to a user input indicating movement of the one graphic element in at least one of a horizontal direction and a vertical direction, the step of adjusting further including determining when a portion of the non-visible graphic elements from the first set of graphic elements exceeds a boundary of the first predefined area, transferring the portion of the non-visible graphic elements to an opposite region of the first predefined region and adjacent to the second predefined region;

replacing the portion of the non-visible graphic elements with at least one graphic element from the database; and providing a second set of graphic elements, the second set of graphic elements including the at least one graphic element from the database in the first predefined area but outside the second predefined area.

2. The method as in claim 1, further comprising:

selecting at least one second graphic element in response to a user input;

adjusting an appearance of the selected at least one second graphic element to reveal information of specific content associated to the selected at least one second graphic element; and executing the specific content associated to the selected at least one second graphic element in response to a user input.

3. The method as in claim 1, wherein each graphic element represents specific content associated to the at least one graphic element, the specific content including at least one of an image, a title, a rating and a uniform resource locator (URL), and the graphic elements of the grid pattern are organized according to at least one variable related to the specific content, the at least one variable related to the specific content includes at least one of an alpha-numeric designation and genre of the specific content.

4. The method as in claim 1, wherein a container for loading the at least one graphic element in the grid pattern is transferred from one side of the first predefined area outside the displayed portion to the other side of the first predefined area when the at least one graphic element exceeds a boundary of the first predefined area and wherein upon transfer the at least one graphic element is unloaded from the container and at least one second graphic element is loaded in the container.

5. The method as in claim 1, wherein upon adjusting the position of one of the graphic elements, the first set of graphic elements move as a contiguous unit.

6. The method as in claim 1, wherein upon adjusting the position of one of the graphic elements, a portion of the generated graphic elements in the second predefined area moves outside of the second predefined area and are not visible on the display, and a portion of the generated graphic elements outside of the second predefined area moves inside the second predefined area and are visible on the display.

7. The method as in claim 1, wherein the step of providing a first set of graphic elements from a database of graphic elements further includes the step of displaying the first set of graphics elements on a display and wherein the step of providing a second set of graphic elements from the database of graphic elements further includes the step of displaying the second set of graphics elements on a display.

8. The method as in claim 1, wherein the step of adjusting a position of one of the graphic elements in the first set of graphic elements includes adjusting the position of one of the graphic elements in the first set of graphic elements to a point central on the display.

9. An apparatus for searching for content comprising:

a memory that includes a database containing a plurality of graphic elements arranged in a pattern;

a display interface coupled to the memory, the display interface providing a first set of the plurality of graphic elements to a display device such that the display device can display the first set of the plurality of graphic elements in a first predefined area, the first predefined area including a second predefined area for displaying a portion of the first set of graphic elements, the graphic elements in the first predefined area but outside of the second predefined area not being visible on the display, each of the graphic elements comprising an image associated with at least one of a video and audio program;

a user interface that receives a user input indicating a desired movement in at least one of horizontal and vertical directions of one of the displayed graphic elements in the second predefined area; and a controller, coupled to the user interface and the display interface, the controller adjusting a display position of the one graphic element in response to the user input, the controller further determining when a portion of the non-visible graphic elements from the first set of graphic elements exceeds a boundary of the first predefined area, transferring the portion of the non-visible graphic elements to an opposite region of the first predefined region and adjacent to the second predefined region and replacing the portion of the non-visible graphic elements with at least one graphic element from the database.

10. The apparatus of claim 9 wherein the pattern of graphic elements contained in the memory is larger than a display area of the display device.

11. The apparatus as in claim 9, wherein the user input is at least one of a movement made on a touch panel remote device and a gesture using a motion sensing remote controller.

12. The apparatus as in claim 9, wherein in response to the user input selecting at least one second graphic element, the controller adjusts an appearance of the highlighted at least one second graphic element to reveal information of specific content associated to the selected at least one second graphic element, the adjustment including the display interface providing the information to the display device, the controller further executes the specific content associated to the selected at least one second graphic element in response to a user input.

13. The apparatus as in claim 9, wherein each graphic element represents specific content associated to the at least one graphic element, the specific content including at least one of an image, a title, a rating and a uniform resource locator (URL),and the graphic elements of the pattern are organized according to at least one variable related to the specific content, the at least one variable related to the specific content includes at least one of an alpha-numeric designation and genre of the specific content.

14. The apparatus as in claim 9, wherein the controller further transfers a container for loading the at least one graphic element from one side of the first predefined area outside the displayed portion to the other side of the first predefined area when the at least one graphic element exceeds a boundary of the predefined area, and wherein upon transfer, the controller unloads the at least one graphic element from the container and loads the at least one second graphic element in the container.

15. The apparatus as in claim 9, wherein upon adjusting the display position of the at least one of the graphic elements, the controller moves a portion of the first set of the plurality of graphic elements in the second predefined area outside of the second predefined area such that this portion is not visible on the display device, and moves another portion of the first set of the plurality of graphic elements from outside of the second predefined area to inside the second predefined area such that this portion is visible on the display device.

* * * * *